United States Patent
Smith et al.

(10) Patent No.: US 11,148,823 B2
(45) Date of Patent: Oct. 19, 2021

(54) CATALYTIC FUEL TANK INERTING APPARATUS FOR AIRCRAFT

(71) Applicant: Hamilton Sundstrand Corporation, Charlotte, NC (US)

(72) Inventors: Lance L. Smith, West Hartford, CT (US); Eric Surawski, Glastonbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/829,566

(22) Filed: Mar. 25, 2020

(65) Prior Publication Data

US 2020/0239153 A1 Jul. 30, 2020

Related U.S. Application Data

(60) Division of application No. 15/883,244, filed on Jan. 30, 2018, now Pat. No. 10,640,227, which is a continuation-in-part of application No. 15/652,454, filed on Jul. 18, 2017, now abandoned.

(60) Provisional application No. 62/370,316, filed on Aug. 3, 2016, provisional application No. 62/456,267, filed on Feb. 8, 2017, provisional application No. 62/456,284, filed on Feb. 8, 2017, provisional application No. 62/456,289, filed on Feb. 8, 2017, provisional application No. 62/456,301, filed on Feb. 8, 2017, provisional application No. 62/456,306, filed
(Continued)

(51) Int. Cl.
*B64D 37/32* (2006.01)
*B64D 37/04* (2006.01)
*A62C 3/08* (2006.01)
*A62C 3/06* (2006.01)
*F02M 21/06* (2006.01)
*F02M 27/02* (2006.01)

(52) U.S. Cl.
CPC .............. *B64D 37/32* (2013.01); *A62C 3/065* (2013.01); *A62C 3/08* (2013.01); *B64D 37/04* (2013.01); *F02M 21/06* (2013.01); *F02M 27/02* (2013.01)

(58) Field of Classification Search
CPC ........ B64D 37/32; B64D 37/04; A62C 3/065; A62C 3/08; F02M 21/06; F02M 27/02
USPC ..................................................... 244/129.2
See application file for complete search history.

(56) References Cited

U.S. PATENT DOCUMENTS 2,938,576 A  5/1960  Cox et al.
3,353,921 A  11/1967  Hirt
(Continued)

FOREIGN PATENT DOCUMENTS

GB  690805 A  4/1953
GB  1395691 A  5/1975
(Continued)

*Primary Examiner* — Anita Nassiri-Motlagh
(74) *Attorney, Agent, or Firm* — Cantor Colburn LLP

(57) ABSTRACT

Fuel tank inerting systems and methods for aircraft are provided. The systems include a fuel tank, a first reactant source fluidly connected to the fuel tank, the first source arranged to receive fuel from the fuel tank, a second reactant source, a catalytic reactor arranged to receive a first reactant from the first source and a second reactant from the second source to generate an inert gas that is supplied to the fuel tank to fill a ullage space of the fuel tank, and an inert gas recycling system located downstream of the catalytic reactor and upstream of the fuel tank, wherein the inert gas recycling system is arranged to direct a portion of the inert gas to the catalytic reactor.

12 Claims, 14 Drawing Sheets

Related U.S. Application Data on Feb. 8, 2017, provisional application No. 62/456,312, filed on Feb. 8, 2017, provisional application No. 62/501,286, filed on May 4, 2017, provisional application No. 62/501,293, filed on May 4, 2017.

(56) References Cited

U.S. PATENT DOCUMENTS

| | | |
|---|---|---|
| 3,847,298 A | 11/1974 | Hamilton |
| 4,190,030 A | 2/1980 | Chester |
| 7,306,644 B2 | 12/2007 | Leigh et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,828,874 B2 | 11/2010 | Surawski et al. |
| 7,896,292 B2 | 3/2011 | Limaye et al. |
| 7,905,259 B2 | 3/2011 | Johnson et al. |
| 8,015,838 B2 | 9/2011 | Lippold et al. |
| 8,499,567 B2 | 8/2013 | Hagh et al. |
| 8,602,362 B2 | 12/2013 | Buchwald |
| 8,828,344 B2 | 9/2014 | K-Wlam et al. |
| 8,904,669 B2 | 12/2014 | Tichborne et al. |
| 9,102,416 B1 | 8/2015 | Cutler |
| 9,144,768 B2 | 9/2015 | Tichborne et al. |
| 2001/0014301 A1 | 8/2001 | Nakamura et al. |
| 2002/0088504 A1 | 7/2002 | Sauer |
| 2004/0163826 A1 | 8/2004 | Spring |
| 2005/0160671 A1 | 7/2005 | Wakao et al. |
| 2005/0274107 A1 | 12/2005 | Liu et al. |
| 2008/0099618 A1 | 5/2008 | Zaki et al. |
| 2008/0107571 A1 | 5/2008 | Johnson et al. |
| 2008/0128048 A1 | 6/2008 | Johnson et al. |
| 2010/0021360 A1 | 1/2010 | Leenders et al. |
| 2011/0262309 A1 | 10/2011 | Limaye et al. |
| 2012/0035406 A1 | 2/2012 | Lam et al. |
| 2012/0248242 A1 | 10/2012 | Gagne et al. |
| 2014/0238501 A1 | 8/2014 | Tichborne et al. |
| 2014/0252171 A1 | 9/2014 | Dooley et al. |
| 2015/0314229 A1 | 11/2015 | Johnson et al. |
| 2016/0009406 A1 | 1/2016 | Burnell et al. |
| 2016/0030871 A1 | 2/2016 | Krause |
| 2016/0122004 A1 | 5/2016 | Ribarov et al. |
| 2016/0311538 A1 | 10/2016 | Bruno et al. |
| 2016/0362118 A1 | 12/2016 | Mollicone et al. |
| 2018/0037334 A1 | 2/2018 | Surawski et al. |
| 2018/0148188 A1 | 5/2018 | Surawski |
| 2018/0148189 A1 | 5/2018 | Surawski |
| 2018/0148190 A1 | 5/2018 | Surawski |
| 2018/0148191 A1 | 5/2018 | Smith et al. |
| 2018/0155047 A1 | 6/2018 | Surawski |
| 2018/0155048 A1 | 6/2018 | Surawski |
| 2018/0155049 A1 | 6/2018 | Smith et al. |
| 2018/0155050 A1 | 6/2018 | Surawski et al. |

FOREIGN PATENT DOCUMENTS

| | | |
|---|---|---|
| GB | 2374007 A | 10/2002 |
| JP | 2006124259 A | 5/2006 |

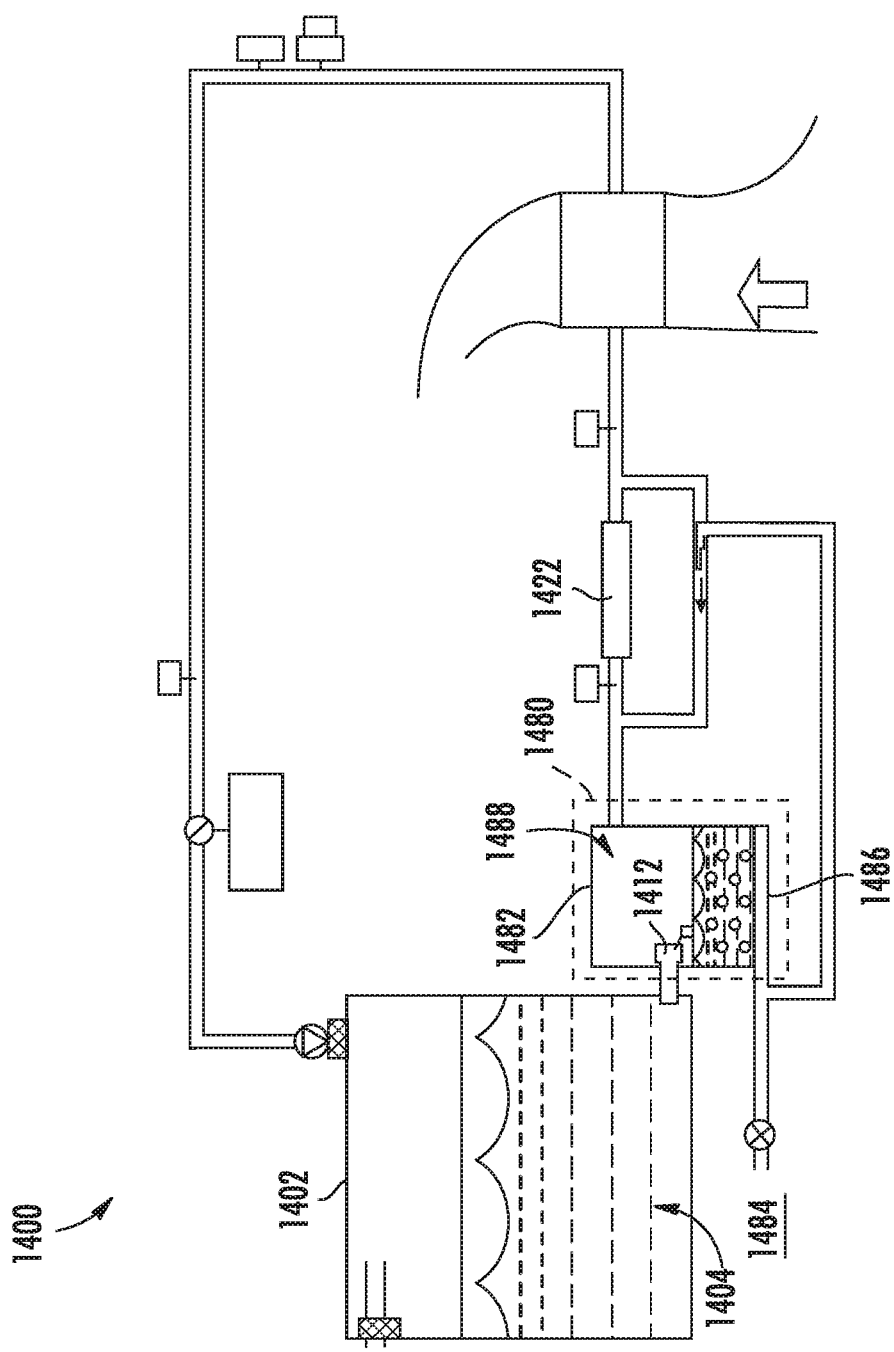

CATALYTIC FUEL TANK INERTING APPARATUS FOR AIRCRAFT

CROSS-REFERENCE TO RELATED APPLICATIONS

The present application is a divisional application of U.S. Ser. No. 15/883,244, having the same title as the present application, filed on Jan. 30, 2018. U.S. Ser. No. 15/883,244 is a continuation-in-part application of U.S. Ser. No. 15/652,454, entitled "Catalytic Fuel Tank Inerting Apparatus for Aircraft," filed Jul. 18, 2017, which claims priority to U.S. Provisional Application Ser. No. 62/370,316, filed Aug. 3, 2016, the contents of which are incorporated by reference herein in their entirety. U.S. Ser. No. 15/883,244, claims priority from U.S. Provisional Patent Application No. 62/456,267, filed Feb. 8, 2017; U.S. Provisional Patent Application No. 62/456,284, filed Feb. 8, 2017; U.S. Provisional Patent Application No. 62/456,289, filed Feb. 8, 2017; U.S. Provisional Patent Application No. 62/456,301, filed Feb. 8, 2017; U.S. Provisional Patent Application No. 62/456,306, filed Feb. 8, 2017; U.S. Provisional Patent Application No. 62/456,312, filed Feb. 8, 2017; U.S. Provisional Patent Application No. 62/501,286, filed May 4, 2017; and U.S. Provisional Patent Application No. 62/501,293, filed May 4, 2017. The contents of the priority applications are hereby incorporated by reference in their entireties.

BACKGROUND

The subject matter disclosed herein generally relates to fuel tank inerting systems for aircraft and, more particularly, to fuel tank inerting systems configured to supply inert gas in an aircraft.

In general, aircraft pneumatic systems including, air conditioning systems, cabin pressurization and cooling, and fuel tank inerting systems are powered by engine bleed air. For example, pressurized air from an engine of the aircraft is provided to a cabin through a series of systems that alter the temperatures and pressures of the pressurized air. To power this preparation of the pressurized air, generally the source of energy is the pressure of the air itself.

The air bled from engines may be used for environmental control systems, such as used to supply air to the cabin and to other systems within an aircraft. Additionally, the air bled from engines may be supplied to inerting apparatuses to provide inert gas to a fuel tank. In other cases, the air may be sourced from compressed RAM air.

Regardless of the source, typically the air for fuel tank inerting is passed through a porous hollow fiber membrane tube bundle known as an "air separation module." A downstream flow control valve is controlled or passively operated to apply back pressure on the air separation module to force some amount of air through the membrane as opposed to flowing though the tube. Oxygen passes more easily through the membrane, leaving only nitrogen enriched air to continue through the flow control valve into the fuel tank. Typically air separation modules employ a dedicated ram air heat exchanger in conjunction with a bypass valve.

BRIEF DESCRIPTION

According to some embodiments, fuel tank inerting systems for aircraft are provided. The systems include a fuel tank, a first reactant source fluidly connected to the fuel tank, the first source arranged to receive fuel from the fuel tank, a second reactant source, a catalytic reactor arranged to receive a first reactant from the first source and a second reactant from the second source to generate an inert gas that is supplied to the fuel tank to fill a ullage space of the fuel tank, and an inert gas recycling system located downstream of the catalytic reactor and upstream of the fuel tank, wherein the inert gas recycling system is arranged to direct a portion of the inert gas to the catalytic reactor.

In addition to one or more of the features described herein, or as an alternative, further embodiments of the fuel tank inerting systems may include that the first source is an evaporator container.

In addition to one or more of the features described herein, or as an alternative, further embodiments of the fuel tank inerting systems may include that the second source is at least one of a bleed port of an engine of an aircraft and an aircraft cabin.

In addition to one or more of the features described herein, or as an alternative, further embodiments of the fuel tank inerting systems may include a heat exchanger arranged between the catalytic reactor and the fuel tank and configured to at least one of cool and condense an output from the catalytic reactor to separate out an inert gas and a byproduct.

In addition to one or more of the features described herein, or as an alternative, further embodiments of the fuel tank inerting systems may include that the byproduct is water.

In addition to one or more of the features described herein, or as an alternative, further embodiments of the fuel tank inerting systems may include discharge air from an environmental control system of the aircraft is provided to the heat exchanger to enable cooling of the output from the catalytic reactor.

In addition to one or more of the features described herein, or as an alternative, further embodiments of the fuel tank inerting systems may include an injector pump arranged to receive the first reactant and the second reactant and to supply a mixture of the first reactant and the second reactant to the catalytic reactor.

In addition to one or more of the features described herein, or as an alternative, further embodiments of the fuel tank inerting systems may include a heating duct thermally connected to the catalytic reactor and arranged in thermal communication with the first source to provide heat to the first source to generate the first reactant.

In addition to one or more of the features described herein, or as an alternative, further embodiments of the fuel tank inerting systems may include at least one additional fuel tank, wherein the at least one additional fuel tank is arranged to receive inert gas from the catalytic reactor.

In addition to one or more of the features described herein, or as an alternative, further embodiments of the fuel tank inerting systems may include a water separator located between the catalytic reactor and the fuel tank and downstream of the catalytic reactor, the water separator arranged to extract water from the reacted first reactant and second reactant.

According to some embodiments, methods of supplying inert gas to fuel tanks of aircraft are provided. The methods include supplying fuel from a fuel tank to a first reactant source, generating a first reactant within the first reactant source, mixing the first reactant with a second reactant supplied from a second reactant source, catalyzing the mixed first reactant and second reactant within a catalytic reactor to generate an inert gas, supplying the inert gas to the fuel tank to fill a ullage space of the fuel tank, and recycling a portion of the inert gas and supplying the recycled portion to the catalytic reactor.

In addition to one or more of the features described herein, or as an alternative, further embodiments of the methods may include that the first source is an evaporator container.

In addition to one or more of the features described herein, or as an alternative, further embodiments of the methods may include that the second source is at least one of a bleed port of an engine of an aircraft and an aircraft cabin.

In addition to one or more of the features described herein, or as an alternative, further embodiments of the methods may include at least one of cooling and condensing an output from the catalytic reactor to separate out an inert gas and a byproduct with a heat exchanger arranged between the catalytic reactor and the fuel tank.

In addition to one or more of the features described herein, or as an alternative, further embodiments of the methods may include that the byproduct is water.

In addition to one or more of the features described herein, or as an alternative, further embodiments of the methods may include supplying discharge air from an environmental control system of the aircraft to the heat exchanger to enable cooling of the output from the catalytic reactor.

In addition to one or more of the features described herein, or as an alternative, further embodiments of the methods may include mixing and injecting the first reactant and the second reactant using an injector pump to supply a mixture of the first reactant and the second reactant to the catalytic reactor.

In addition to one or more of the features described herein, or as an alternative, further embodiments of the methods may include heating the first reactant source with a heating duct thermally connected to the catalytic reactor and arranged in thermal communication with the first source to provide heat to the first source to generate the first reactant.

In addition to one or more of the features described herein, or as an alternative, further embodiments of the methods may include supplying the inert gas to at least one additional fuel tank from the catalytic reactor.

In addition to one or more of the features described herein, or as an alternative, further embodiments of the methods may include extracting water from the reacted first reactant and second reactant using a water separator located between the catalytic reactor and the fuel tank and downstream of the catalytic reactor.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 14 is a schematic illustration of a fuel tank inerting system in accordance with an embodiment of the present disclosure.

DETAILED DESCRIPTION

Figure 1A:
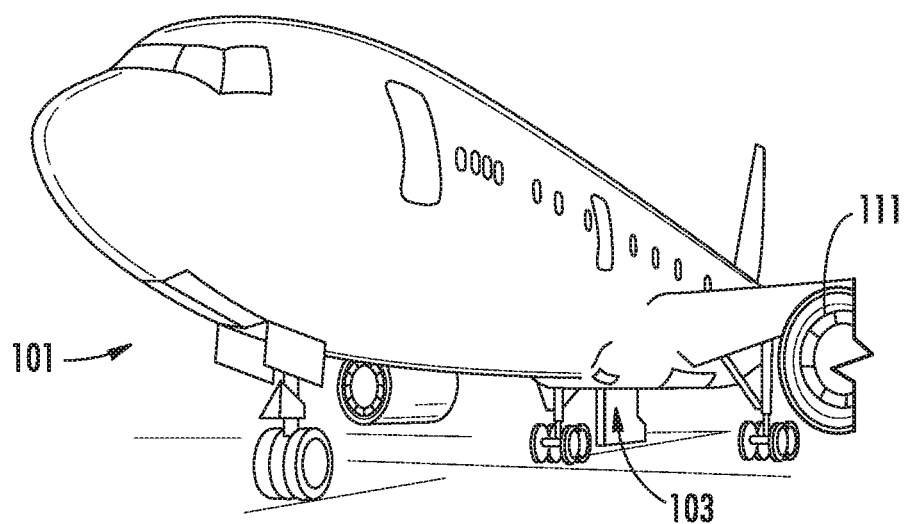
FIG. 1A is a schematic illustration of an aircraft that can incorporate various embodiments of the present disclosure.
Figure 1B:
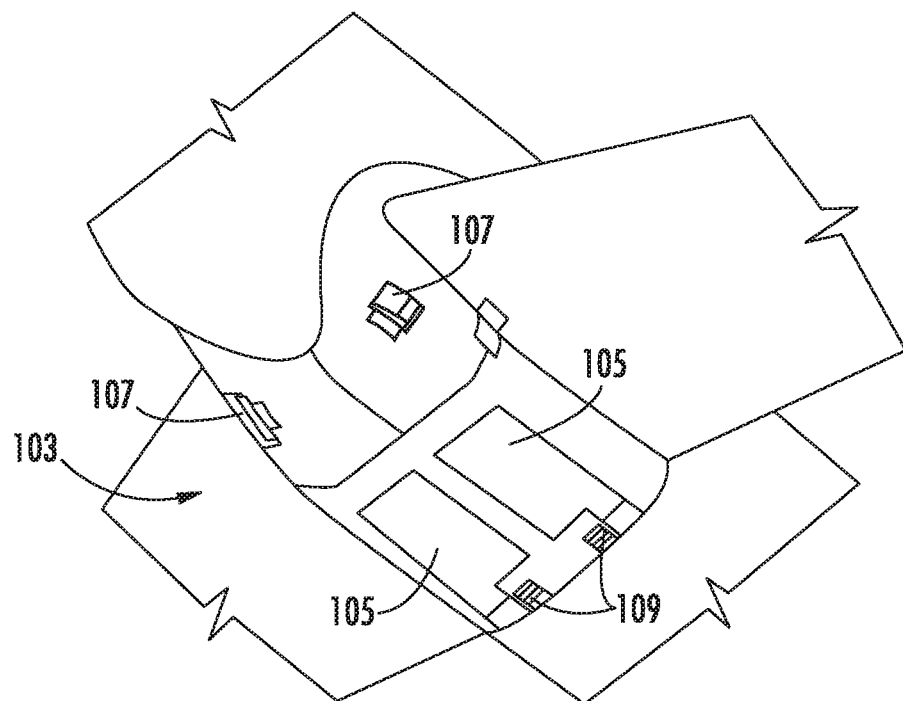
FIG. 1B is a schematic illustration of a bay section of the aircraft of FIG. 1A.

As shown in FIGS. 1A-1B, an aircraft 101 can include one or more bays 103 beneath a center wing box. The bay 103 can contain and/or support one or more components of the aircraft 101. For example, in some configurations, the aircraft 101 can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft 101, air that is external to the aircraft 101 can flow into one or more environmental control systems within the bay doors 105 through one or more ram air inlets 107. The air may then flow through the environmental control systems to be processed and supplied to various components or locations within the aircraft 101 (e.g., passenger cabin, fuel inerting systems, etc.). Some air may be exhaust through one or more ram air exhaust outlets 109.

Also shown in FIG. 1A, the aircraft 101 includes one or more engines 111. The engines 111 are typically mounted on wings of the aircraft 101, but may be located at other locations depending on the specific aircraft configuration. In some aircraft configurations, air can be bled from the engines 111 and supplied to environmental control systems and/or fuel inerting systems, as will be appreciated by those of skill in the art.

As noted above, typical air separation modules operate using pressure differentials to achieve desired air separation. Such systems require a high pressure pneumatic source to drive the separation process across the membrane. Further, the hollow fiber membrane separators commonly used are relatively large in size and weight, which is a significant consideration with respect to aircraft (e.g., reductions in volume and weight of components can improve flight efficiencies). Embodiments provided herein provide reduced volume and/or weight characteristics of inert-gas or low-oxygen supply systems for aircraft. Further, embodiments provided herein can prevent humid air from entering fuel tanks of the aircraft, thus preventing various problems that may arise with some fuel system components. In accordance with some embodiments of the present disclosure, the typical hollow fiber membrane separator is replaced by a catalytic system (e.g., $CO_2$ generation system), which can be, for example, smaller, lighter, and/or more efficient than the typical fiber membrane separators. That is, in accordance with embodiments of the present disclosure, the use of hollow fiber membrane separators may be eliminated.

A function of fuel tank flammability reduction systems in accordance with embodiments of the present disclosure is accomplished by reacting a small amount of fuel vapor (e.g., a "first reactant") with a source of gas containing oxygen (e.g., a "second reactant"). The product of the reaction is carbon dioxide and water vapor. The source of the second reactant (e.g., air) can be bleed air or any other source of air containing oxygen, including, but not limited to, high-pressure sources (e.g., engine), bleed air, cabin air, etc. A catalyst material is used to induce a chemical reaction, including, but not limited to, precious metal materials. The carbon dioxide that results from the reaction is an inert gas that is mixed with nitrogen naturally found in fresh/ambient air, and is directed back within a fuel tank to create an inert environment within the fuel tank, thus reducing a flammability of the vapors in the fuel tank. Further, in some embodiments, the fuel tank flammability reduction or inerting systems of the present disclosure can provide a functionality such that water vapor from the atmosphere does not enter the fuel tanks during descent stages of flight of an aircraft. This can be accomplished by controlling a flow rate of inert gas into the fuel tank so that a positive pressure is continuously maintained in the fuel tank.

In accordance with embodiments of the present disclosure, a catalyst is used to induce a chemical reaction between oxygen ($O_2$) and fuel vapor to produce carbon dioxide ($CO_2$) and water vapor. The source of $O_2$ used in the reaction can come from any of a number of sources, including, but not limited to, pneumatic sources on an aircraft that supply air at a pressure greater than ambient. The fuel vapor is created by draining a small amount of fuel from an aircraft fuel tank into an evaporator container. The fuel can be heated to vaporize the fuel, such as by using an electric heater, as shown and described in some embodiments of the present disclosure. The fuel vapor is removed from the evaporator container, in some embodiments, by an ejector which can induce a suction pressure that pulls the fuel vapor out of the evaporator container. Such ejectors can utilize elevated pressures of a second reactant source containing $O_2$ (e.g., a pneumatic source) to induce a secondary flow of the ejector which is sourced from the evaporator container. As such, the ejector can be used to mix the extracted fuel vapor with the $O_2$ from a second reactant source.

The mixed air stream (fuel vapor and Oxygen or air) is then introduced to a catalyst, which induces a chemical reaction that transforms the $O_2$ and fuel vapor into $CO_2$ and water vapor. Any inert gas species that are present in the mixed stream (for example, Nitrogen), will not react and will thus pass through the catalyst unchanged. In some embodiments, the catalyst is in a form factor that acts as a heat exchanger. For example, in one non-limiting configuration, a plate fin heat exchanger configuration is employed wherein a hot side of the heat exchanger would be coated with catalyst material. In such arrangement, the cold side of the catalyst heat exchanger can be fed with a cool air source, such as ram air or some other source of cold air. The air through the cold side of the heat exchanger can be controlled such that the temperature of a hot, mixed-gas stream is hot enough to sustain a desired chemical reaction within or at the catalyst. Further, the cooling air can be used to maintain a cool enough temperature to enable removal of heat generated by exothermic reactions at the catalyst.

As noted above, the catalytic chemical reaction generates water vapor. Having water (in any form) enter primary fuel tank can be undesirable. Thus, in accordance with embodiments of the present disclosure, the water from a product gas stream (e.g., exiting the catalyst) can be removed through various mechanisms, including, but not limited to, condensation. The product gas stream can be directed to enter a heat exchanger downstream from the catalyst that is used to cool the product gas stream such that the water vapor condenses and drops out of the product gas stream. The liquid water can then be drained overboard. In some embodiments, an optional water separator can be used to augment or provide water separation from the product stream.

In some embodiments, a flow control valve meters a flow of an inert gas (with water vapor removed therefrom) to a predetermined and/or controlled inert gas flow rate. Further, in some embodiments, an optional fan can be used to boost the inert gas stream pressure to overcome a pressure drop associated with ducting and flow lines between the catalyst and a fuel tank into which the inert gas is supplied. In some embodiments, a flame arrestor can be arranged at an inlet to the fuel tank (where the inert gas enters) to prevent any potential flames from propagating into the fuel tank.

Independent of any aircraft flammability reduction systems, aircraft fuel tanks are typically vented to ambient. At altitude, pressure inside the fuel tank is very low and is roughly equal to ambient pressure. However, during descent, the pressure inside the fuel tank needs to rise to equal ambient pressure at sea level (or at whatever altitude the aircraft is landing). The change in pressures requires gas entering the tank from outside to equalize the pressure. When air from outside enters the tank, water vapor is normally present with it. Water can become trapped in the fuel tank and cause problems. In accordance with embodiments of the present disclosure, to prevent water from entering the fuel tanks, the fuel inerting systems of the present disclosure can repressurize the fuel tanks with dry inert gas that is generated as described above and below. The repressurization can be accomplished by using a flow control valve to control the flow of inert gas into the fuel tank such that a positive pressure is constantly maintained in the fuel tank. The positive pressure within the fuel tank can prevent air from entering the fuel tank from outside during descent and therefore prevent water from entering the fuel tank.

Figure 2:
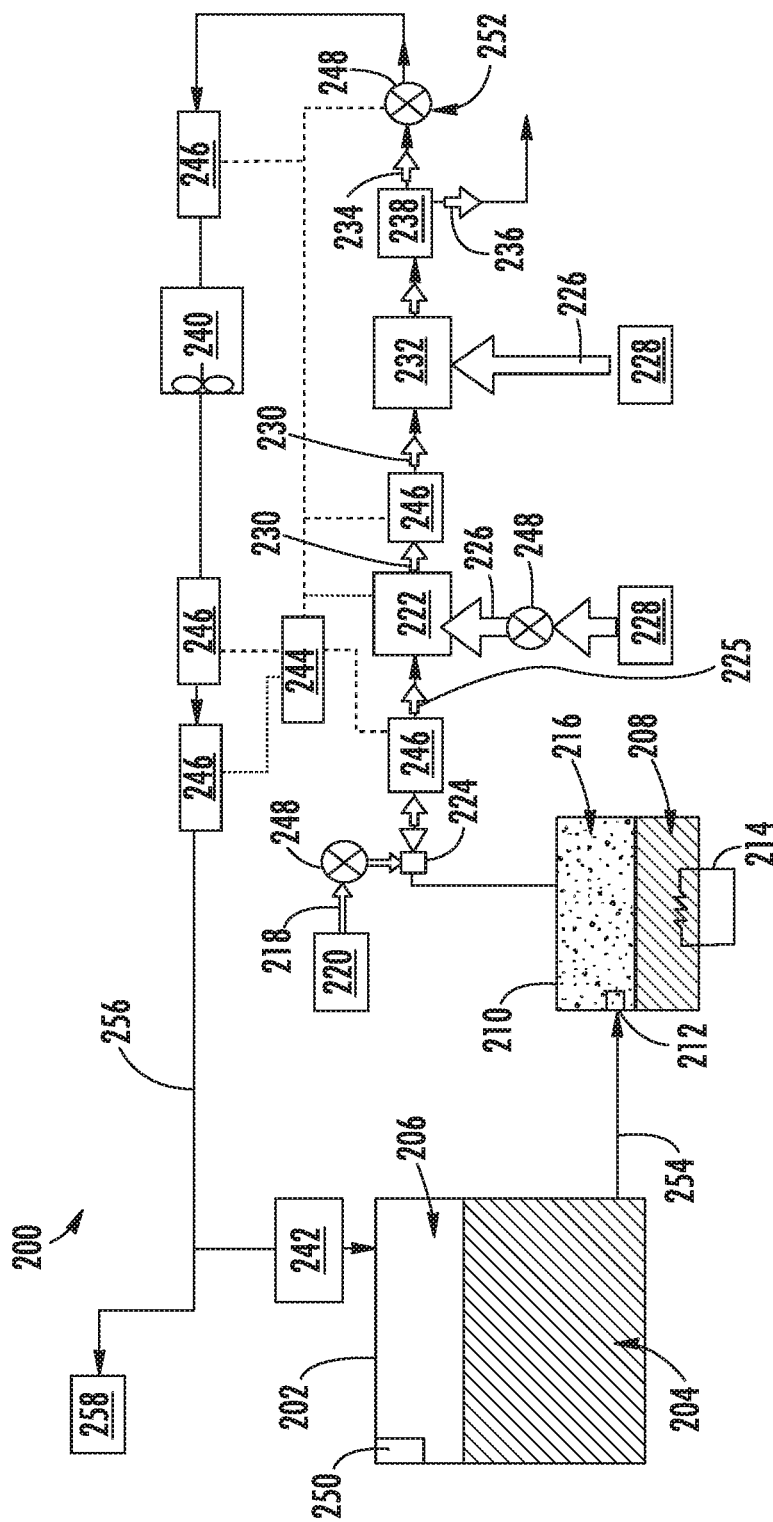
FIG. 2 is a schematic illustration of a fuel tank inerting system in accordance with an embodiment of the present disclosure.

FIG. 2 is a schematic illustration of a flammability reduction or inerting system 200 utilizing a catalytic reaction to produce inert gas in accordance with an embodiment of the present disclosure. The inerting system 200, as shown, includes a fuel tank 202 having fuel 204 therein. As the fuel 204 is consumed during operation of one or more engines, an ullage space 206 forms within the fuel tank 202. To reduce flammability risks associated with vaporized fuel that may form within the ullage space 206, an inert gas can be generated and fed into the ullage space 206.

In accordance with embodiments of the present disclosure, an inerting fuel 208 can be extracted from the fuel tank 202 and into an evaporator container 210. The amount of fuel 204 that is extracted into the evaporator container 210 (i.e., the amount of inerting fuel 208) can be controlled by an evaporator container valve 212, such as a float valve. The inerting fuel 208, which may be in liquid form when pulled from the fuel tank 202, can be vaporized within the evaporator container 210 using a heater 214, such as an electric heater, to generate a first reactant 216. The first reactant 216 is a vaporized portion of the inerting fuel 208 located within the evaporator container 210. The first reactant 216 is mixed with a second reactant 218 which is sourced from a second reactant source 220. The second reactant 218 is air containing oxygen that is catalyzed with the first reactant 216 to generate an inert gas to be supplied into the ullage space 206 of the fuel tank 202. The second reactant 218 can come from any source on an aircraft that is at a pressure greater than ambient, including, but not limited to bleed air from an engine, cabin air, high pressure air extracted or bled from an engine, etc. (i.e., any second reactant source 220 can take any number of configurations and/or arrangements). The first reactant 216 within the evaporator container 210 and the second reactant 218 can be directed into a catalytic reactor 222 by and/or through a mixer 224, which, in some embodiments, may be an ejector or jet pump. The mixer 224 will mix the first and second reactants 216, 218 into a mixed air stream 225.

The catalyst 222 can be temperature controlled to ensure a desired chemical reaction efficiency such that an inert gas can be efficiently produced by the inerting system 200 from the mixed air stream 225. Accordingly, cooling air 226 can be provided to extract heat from the catalytic reactor 222 to achieve a desired thermal condition for the chemical reaction within the catalytic reactor 222. The cooling air 226 can be sourced from a cool air source 228. A catalyzed mixture 230 leaves the catalytic reactor 222 and is passed through a heat exchanger 232. The heat exchanger 232 operates as a condenser on the catalyzed mixture 230 to separate out an inert gas 234 and a byproduct 236. A cooling air is supplied into the heat exchanger 232 to achieve the condensing functionality. In some embodiments, as shown, a cooling air 226 can be sourced from the same cool air source 228 as that provided to the catalytic reactor 222, although in other embodiments the cool air sources for the two components may be different. The byproduct 236 may be liquid water or water vapor, and thus in the present configuration shown in FIG. 2, a water separator 238 is provided downstream of the heat exchanger 232 to extract the lquid water or water vapor from the catalyzed mixture 230, thus leaving only the inert gas 234 to be provided to the ullage space 206 of the fuel tank 202.

The inerting system 200 can include additional components including, but not limited to, a fan 240, a flame arrestor 242, and a controller 244. Various other components can be included without departing from the scope of the present disclosure. Further, in some embodiments, certain of the included components may be optional and/or eliminated. For example, in some arrangements, the fan 240 and/or the water separator 238 can be omitted. The controller 244 can be in operable communication with one or more sensors 246 and valves 248 to enable control of the inerting system 200.

In one non-limiting example, flammability reduction is achieved by the inerting system 200 by utilizing the catalytic reactor 222 to induce a chemical reaction between oxygen (second reactant 218) and fuel vapor (first reactant 216) to produce carbon dioxide (inert gas 234) and water in vapor phase (byproduct 236). The source of the second reactant 218 (e.g., oxygen) used in the reaction can come from any source on the aircraft that is at a pressure greater than ambient. The fuel vapor (first reactant 216) is created by draining a small amount of fuel 204 from the fuel tank 202 (e.g., a primary aircraft fuel tank) into the evaporator container 210. The inerting fuel 208 within the evaporator container 210 is heated using the electric heater 214. In some embodiments, the first reactant 216 (e.g., fuel vapor) is removed from the evaporator container 210 by using the mixer 224 to induce a suction pressure that pulls the first reactant 216 out of the evaporator container 210. The mixer 224, in such embodiments, utilizes the elevated pressure of the second reactant source 220 to induce a secondary flow within the mixer 224 which is sourced from the evaporator container 210. Further, as noted above, the mixer 224 is used to mix the two gas streams (first and second reactants 216, 218) together to form the mixed air stream 225.

The mixed air stream 225 (e.g., fuel vapor and oxygen or air) is then introduced to the catalytic reactor 222, inducing a chemical reaction that transforms the mixed air stream 225 (e.g., fuel and air) into the inert gas 234 and the byproduct 236 (e.g., carbon dioxide and water vapor). It is noted that any inert gas species that are present in the mixed air stream 225 (for example, nitrogen) will not react and will thus pass through the catalytic reactor 222 unchanged. In some embodiments, the catalytic reactor 222 is in a form factor that acts as a heat exchanger. For example, one non-limiting configuration may be a plate fin heat exchanger wherein the hot side of the heat exchanger would be coated with the catalyst material. Those of skill in the art will appreciate that various types and/or configurations of heat exchangers may be employed without departing from the scope of the present disclosure. The cold side of the catalyst heat exchanger can be fed with the cooling air 226 from the cool air source 228 (e.g., ram air or some other source of cold air). The air through the cold side of the catalyst heat exchanger can be controlled such that the temperature of the hot mixed gas stream 225 is hot enough to sustain the chemical reaction desired within the catalytic reactor 222, but cool enough to remove the heat generated by the exothermic reaction, thus maintaining aircraft safety and materials from exceeding maximum temperature limits.

As noted above, the chemical reaction process within the catalytic reactor 222 can produce byproducts, including water in vapor form. It may be undesirable to have water (in any form) enter the fuel tank 202. Accordingly, water byproduct 236 can be removed from the product gas stream (i.e., inert gas 234) through condensation. To achieve this, catalyzed mixture 230 enters the heat exchanger 232 that is used to cool the catalyzed mixture 230 such that the byproduct 236 can be removed (e.g., a majority of the water vapor condenses and drops out of the catalyzed mixture 230). The byproduct 236 (e.g., liquid water) can then be drained overboard. An optional water separator 238 can be used to accomplish this function.

A flow control valve 248 located downstream of the heat exchanger 232 and optional water separator 238 can meter the flow of the inert gas 234 to a desired flow rate. An optional boost fan 240 can be used to boost the gas stream pressure of the inert gas 234 to overcome a pressure drop associated with ducting between the outlet of the heat exchanger 232 and the discharge of the inert gas 234 into the fuel tank 202. The flame arrestor 242 at an inlet to the fuel tank 202 is arranged to prevent any potential flames from propagating into the fuel tank 202.

Typically, independent of any aircraft flammability reduction system(s), aircraft fuel tanks (e.g., fuel tank 202) need to be vented to ambient. Thus, as shown in FIG. 2, the fuel tank 202 includes a vent 250. At altitude, pressure inside the fuel tank 202 is very low and is roughly equal to ambient pressure. During descent, however, the pressure inside the fuel tank 202 needs to rise to equal ambient pressure at sea level (or whatever altitude the aircraft is landing at). This requires gas entering the fuel tank 202 from outside to equalize the pressure. When air from outside enters the fuel tank 202, water vapor can be carried by the ambient air into the fuel tank 202. To prevent water/water vapor from entering the fuel tank 202, the inerting system 200 can repressurize the fuel tank 202 with the inert gas 234 generated by the inerting system 200. This is accomplished by using the valves 248. For example, one of the valves 248 may be a flow control valve 252 that is arranged fluidly downstream from the catalytic reactor 222. The flow control valve 252 can be used to control the flow of inert gas 234 into the fuel tank 202 such that a slightly positive pressure is always maintained in the fuel tank 202. Such positive pressure can prevent ambient air from entering the fuel tank 202 from outside during descent and therefore prevent water from entering the fuel tank 202.

As noted above, the controller 244 can be operably connected to the various components of the inerting system 200, including, but not limited to, the valves 248 and the sensors 246. The controller 244 can be configured to receive input from the sensors 246 to control the valves 248 and thus maintain appropriate levels of inert gas 234 within the ullage space 206. Further, the controller 244 can be arranged to ensure an appropriate amount of pressure within the fuel tank 202 such that, during a descent of an aircraft, ambient air does not enter the ullage space 206 of the fuel tank 202.

In some embodiments, the inerting system 200 can supply inert gas to multiple fuel tanks on an aircraft. As shown in the embodiment of FIG. 2, an inerting supply line 254 fluidly connects the fuel tank 202 to the evaporator container 210. After the inert gas 234 is generated, the inert gas 234 will flow through a fuel tank supply line 256 to supply the inert gas 234 to the fuel tank 202 and, optionally, additional fuel tanks 258, as schematically shown.

Figure 3:
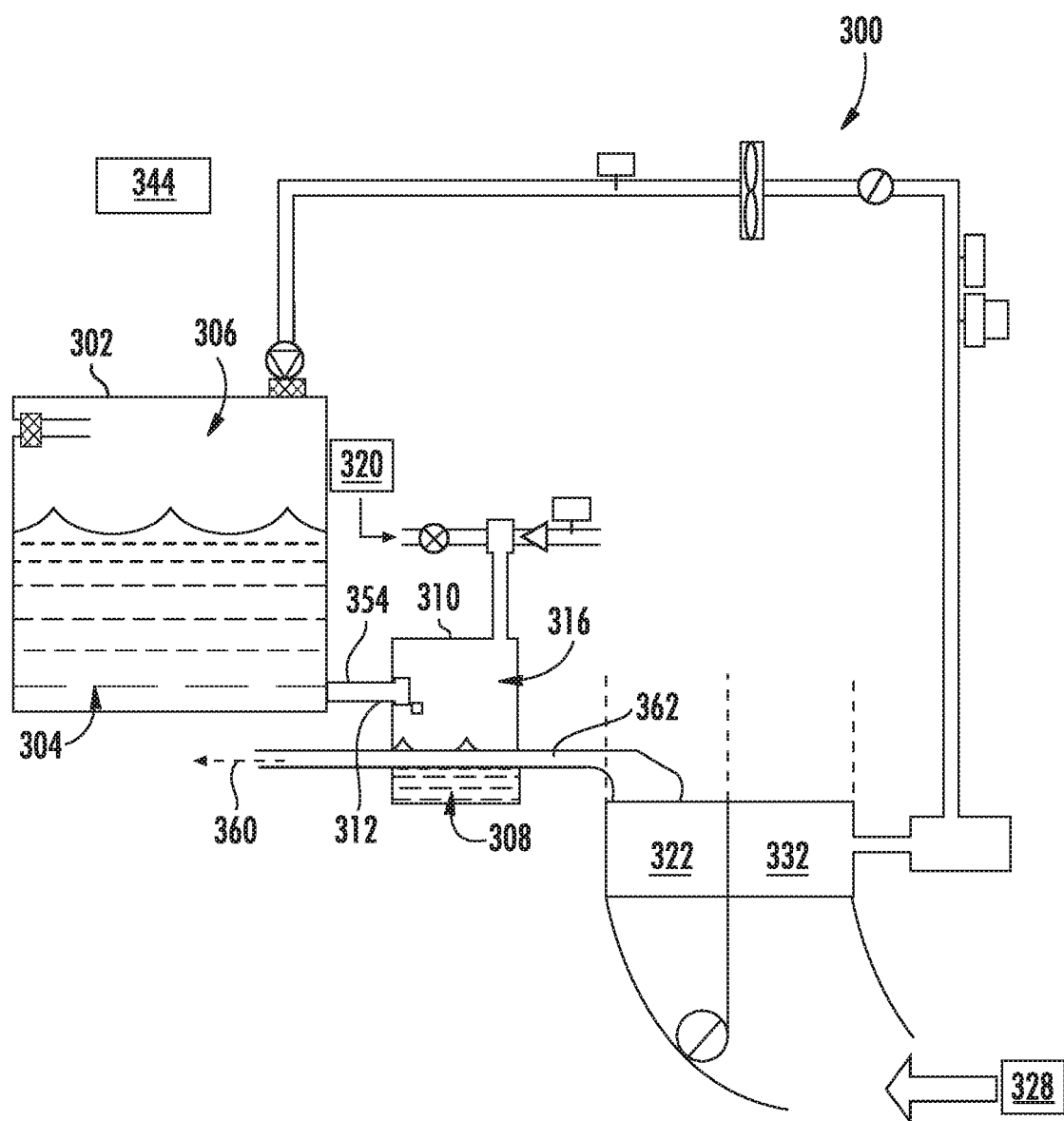
FIG. 3 is a schematic illustration of a fuel tank inerting system in accordance with an embodiment of the present disclosure.

Turning now to FIG. 3, an embodiment of an inerting system 300 in accordance with the present disclosure is shown. The inerting system 300 may be similar to that shown and described above, and thus similar features may not be shown or discussed for simplicity. The inerting system 300 enables the elimination of the heater that is used to vaporize the inerting fuel that is within an evaporator container.

As shown, the inerting system 300 includes a fuel tank 302 having fuel 304 therein, with an ullage space 306 formed as fuel 304 is consumed during use. An inerting supply line 354 fluidly connects the fuel tank 302 to an evaporator container 310, as described above. The amount of fuel 304 that is extracted into the evaporator container 310 (i.e., the amount of inerting fuel 308) can be controlled by an evaporator container valve 312, such as a float valve, and/or operation and/or control by a controller 344. The inerting fuel 308 is vaporized to generate a first reactant 316 for use within a catalytic reactor 322. A second reactant can be sourced from a second reactant source 320, as described above. The first and second reactants are reacted within the catalytic reactor 322 to generate an inert gas for supply into one or more fuel tanks (e.g., fuel tank 302).

In this embodiment, a cool air source 328, such as ram air, is provided to enable cooling of the catalytic reactor 322 as well as enable a condensing function within a heat exchanger 332, as described above. The heat exchanger 332 operates as a condenser on a catalyzed mixture to separate out an inert gas and a byproduct, as described above. In this embodiment, the cooling air is sourced from the same cool air source 328 as that provided to the catalytic reactor 322.

To provide thermal energy for evaporation of the inerting fuel 308, rather than employing a heater element or device, the thermal energy can be supplied from the catalytic reactor 322. That is, heated air 360 generated by exothermic reactions at the catalytic reactor 322 can be directed into and/or through the evaporator container 310 through a heating duct 362. The heating duct 362 can pass through an interior of the evaporator container 310, may be wrapped around the evaporator container 310, and/or may have another arrangement such that thermal energy within the heated air 360 can be transferred into the inerting fuel 308 to thus vaporize the inerting fuel 308. Advantageously, such configuration can reduce weight of the system by eliminating the heater shown in FIG. 2.

Various embodiments provided herein are directed to elimination of the heater (e.g., heater 214 shown in FIG. 2). One arrangement is that shown in FIG. 3, using excess heat from the catalytic reactor. In other embodiments, as described below, direct injection of fuel from the fuel tank can be employed. Accordingly, such systems, such as that shown in FIGS. 4-7, can employ direct injection systems having various configurations. In such embodiments, the typical heater is eliminated and the first reactant is sourced directly from the fuel tank or the evaporator container.

Figure 4:
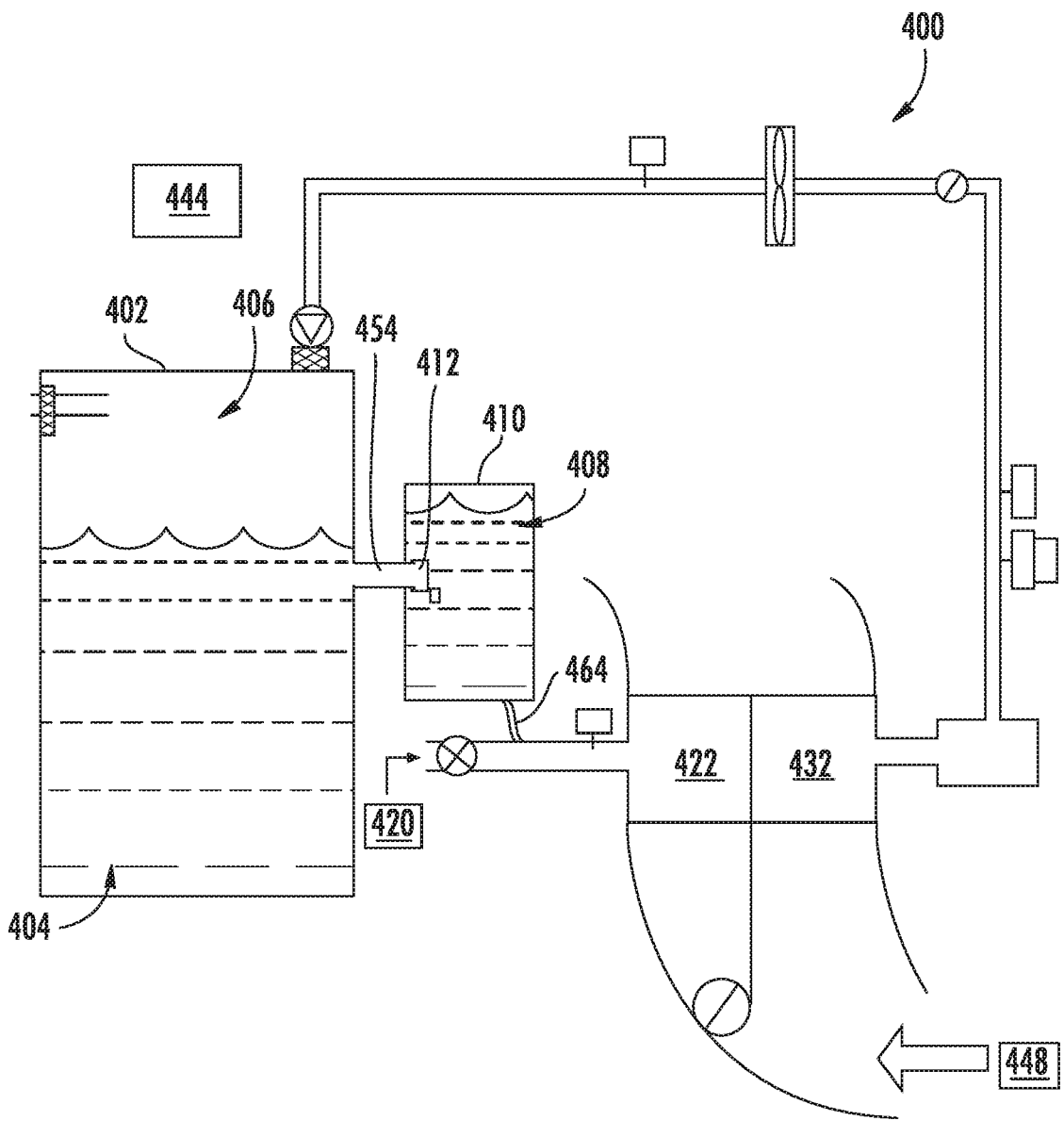
FIG. 4 is a schematic illustration of a fuel tank inerting system in accordance with an embodiment of the present disclosure.

Turning now to FIG. 4, an embodiment of an inerting system 400 in accordance with the present disclosure is shown. The inerting system 400 may be similar to that shown and described above, and thus similar features may not be shown or discussed for simplicity. The inerting system 400 enables the elimination of the heater that is used to vaporize the inerting fuel that is within an evaporator container.

As shown, the inerting system 400 includes a fuel tank 402 having fuel 404 therein, with an ullage space 406 formed as fuel 404 is consumed during use. An inerting supply line 454 fluidly connects the fuel tank 402 to an evaporator container 410, as described above. The amount of fuel 404 that is extracted into the evaporator container 410 (i.e., the amount of inerting fuel 408) can be controlled by an evaporator container valve 412, such as a float valve, and/or operation and/or control by a controller 444. Rather than vaporizing the inerting fuel 408 prior to supplying it into a catalytic reactor 422, a portion of the inerting fuel 408 within the evaporator tank container 410 can be extracted in liquid form and then injected into an air stream where it is vaporized. In one such embodiment, as shown in FIG. 4, a gravity supply line 464 can fluidly connect the evaporator container 410 to a supply line of a second reactant source 420 supply line, as schematically shown. As the inerting fuel 408 enters the supply line, the fuel vaporizes to generate a first reactant. The first and second reactants are reacted within the catalytic reactor 422 to generate an inert gas for supply into one or more fuel tanks (e.g., fuel tank 402). Similar to the prior embodiment, a cool air source 428, such as ram air, is provided to enable cooling of the catalytic reactor 422 as well as enable a condensing function within a heat exchanger 432, as described above. The heat exchanger 432 operates as a condenser on a catalyzed mixture to separate out an inert gas and a byproduct, as described above. In this embodiment, the cooling air is sourced from the same cool air source 428 as that provided to the catalytic reactor 422. Because the inerting fuel 408 is gravity fed into the supply line of the second reactant 420 and vaporized therein, there is no need for a heater to be installed within or to the evaporator container 410. That is, the inerting fuel 408 is directly injected into the second reactant to generate the composition to be reacted within the catalytic reactor 422.

Figure 5:
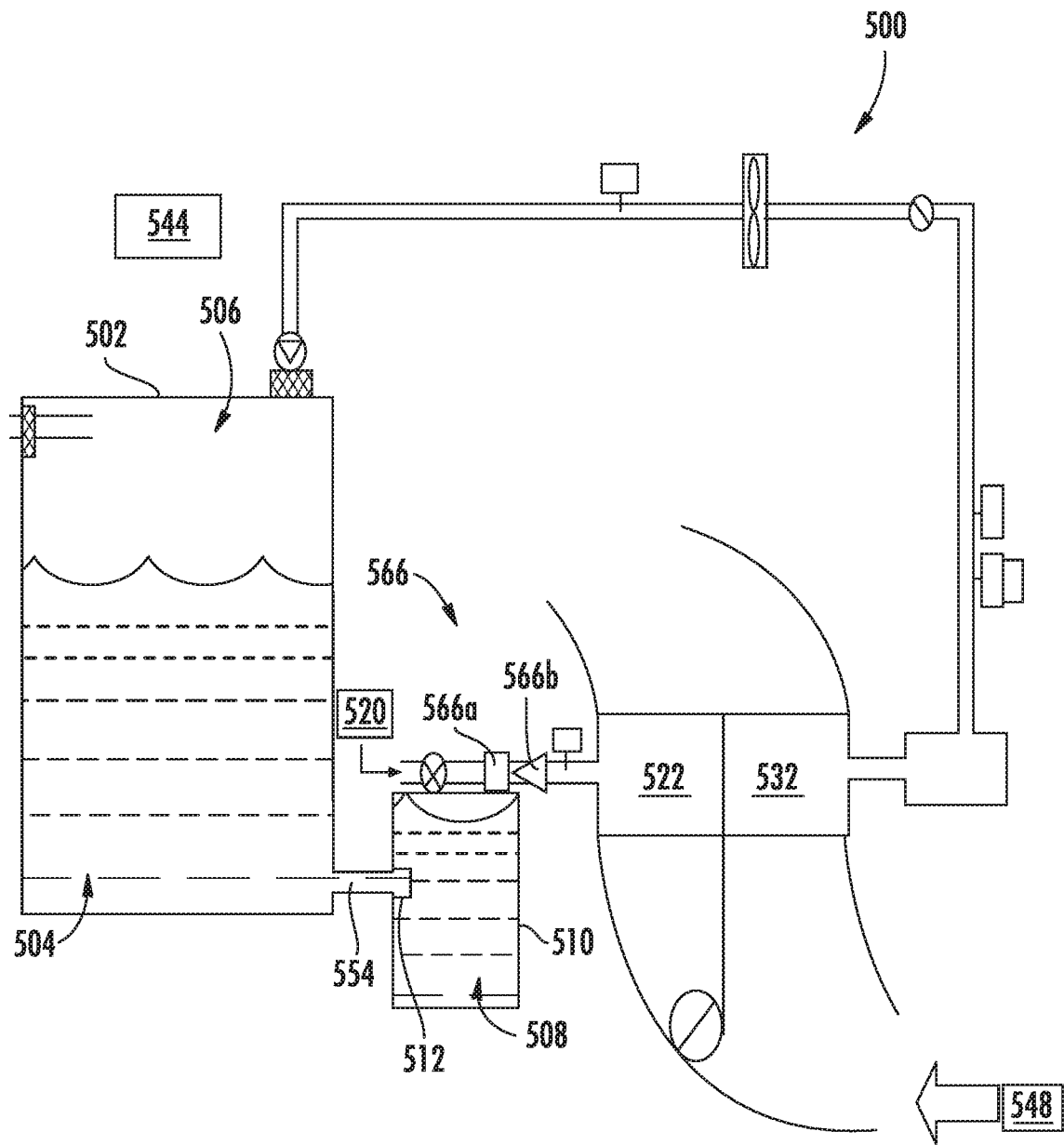
FIG. 5 is a schematic illustration of a fuel tank inerting system in accordance with an embodiment of the present disclosure.

Turning now to FIG. 5, an embodiment of an inerting system 500 in accordance with the present disclosure is shown. The inerting system 500 may be similar to that shown and described above, and thus similar features may not be shown or discussed for simplicity. The inerting system 500 enables the elimination of the heater that is used to vaporize the inerting fuel that is within an evaporator container.

As shown, the inerting system 500 includes a fuel tank 502 having fuel 504 therein, with an ullage space 506 formed as fuel 504 is consumed during use. An inerting supply line 554 fluidly connects the fuel tank 502 to an evaporator container 510, as described above. The amount of fuel 504 that is extracted into the evaporator container 510 (i.e., the amount of inerting fuel 508) can be controlled by an evaporator container valve 512, such as a float valve, and/or operation and/or control by a controller 544. Rather than vaporizing the inerting fuel 508 prior to supplying it into a catalytic reactor 522, the inerting fuel 508 can be vaporized and injected using an injector pump 566 that is also used to mix the vaporized inerting fuel 508 (a first catalyst) with a second reactant provided from a second reactant source 520. The first and second reactants are reacted within the catalytic reactor 522 to generate an inert gas for supply into one or more fuel tanks (e.g., fuel tank 502). Similar to the prior embodiment, a cool air source 528, such as ram air, is provided to enable cooling of the catalytic reactor 522 as well as enable a condensing function within a heat exchanger 532, as described above. The heat exchanger 532 operates as a condenser on a catalyzed mixture to separate out an inert gas and a byproduct, as described above. Because the inerting fuel 508 is vaporized as it passes through the injector pump 566, there is no need for a heater to be installed within or to the evaporator container 510. That is, the inerting fuel 508 is directly injected into the second reactant to generate the composition to be reacted within the catalytic reactor 522.

In some embodiments, the injector pump 566 includes two or more separate elements that provide specific functions. For example, as shown in FIG. 5, the injector pump 566 includes a pump 566a that is arranged to pump the inerting fuel 508 to a high pressure and an injector/mixer 566b that is arranged to inject the inerting fuel 508 into the air stream sourced from the second reactant source 520.

Figure 6A:
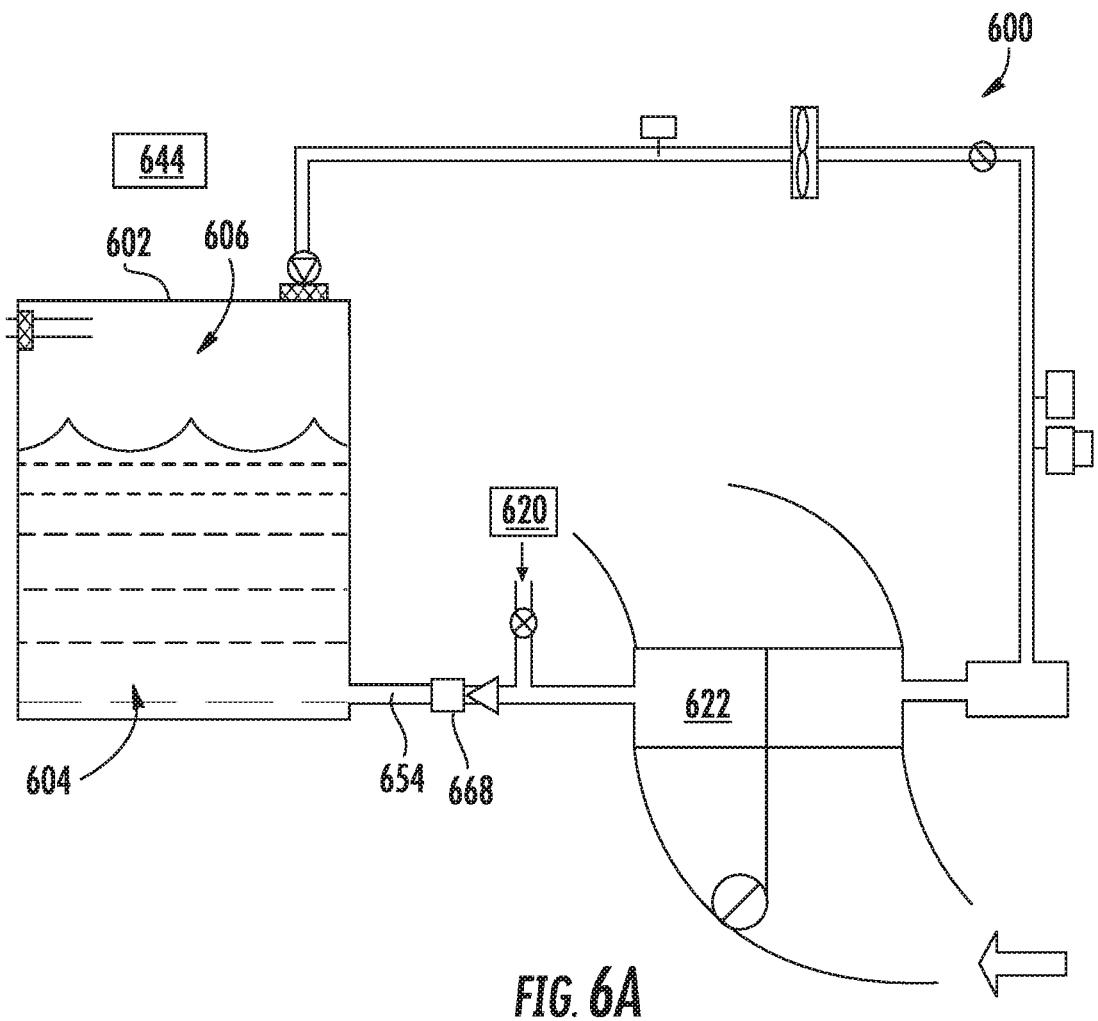
FIG. 6A is a schematic illustration of a fuel tank inerting system in accordance with an embodiment of the present disclosure.
Figure 6B:
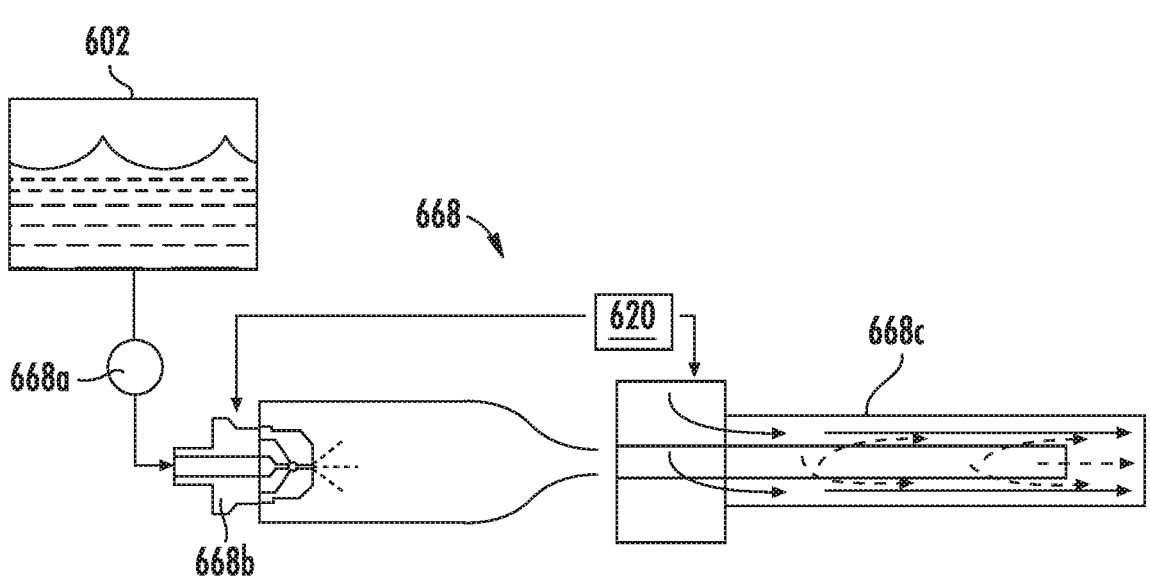
FIG. 6B is a schematic illustration of a portion of the fuel tank inerting system of FIG. 6A.

Turning now to FIGS. 6A-6B, an embodiment of an inerting system 600 in accordance with the present disclosure is shown. The inerting system 600 may be similar to that shown and described above, and thus similar features may not be shown or discussed for simplicity. The inerting system 600 enables the elimination of the heater that is used to vaporize the inerting fuel that is within an evaporator container.

As shown, the inerting system 600 includes a fuel tank 602 having fuel 604 therein, with an ullage space 606 formed as fuel 664 is consumed during use. In contrast to the above described embodiments, an inerting supply line 654 fluidly connects the fuel tank 602 directly to a catalytic reactor 622. In this embodiment, a fuel-pump assembly 668 is installed within or along the inerting supply line 654 which is used to vaporize and mix inerting fuel (from the fuel 604) with a second reactant from a second reactant source 620, with the mixture supplied to a catalytic reactor 622 for catalyzing. The operation of the fuel-pump assembly 668 can be controlled by a controller 644.

FIG. 6B illustrates schematic details of the fuel-pump assembly 668. As shown, fuel from the fuel tank 602 pumped using a fuel pump 668a which injects fuel into a high pressure air supply nozzle 668b. The high pressure air supply nozzle 668b will vaporize the fuel 604 which is then mixed with a second reactant supplied from the second reactant source 620 within a mixing chamber 668c. The mixture is then provided to the catalytic reactor 622. In the configuration shown in FIG. 6B, some amount of air from the second reactant source 620 will be supplied to the high pressure air supply nozzle 668b, as schematically shown.

It will be appreciated that FIG. 6B is merely illustrative, and it not to be limiting. Those of skill in the art will appreciate that the illustrative arrangement shown in FIG. 6B is an example, and other arrangements and/or configurations are possible without departing from the scope of the present disclosure. For example, single-stage pumps/injectors can be used, where all the fuel (first source) is sprayed directed into all of the air (second source) in a single step.

Figure 7:
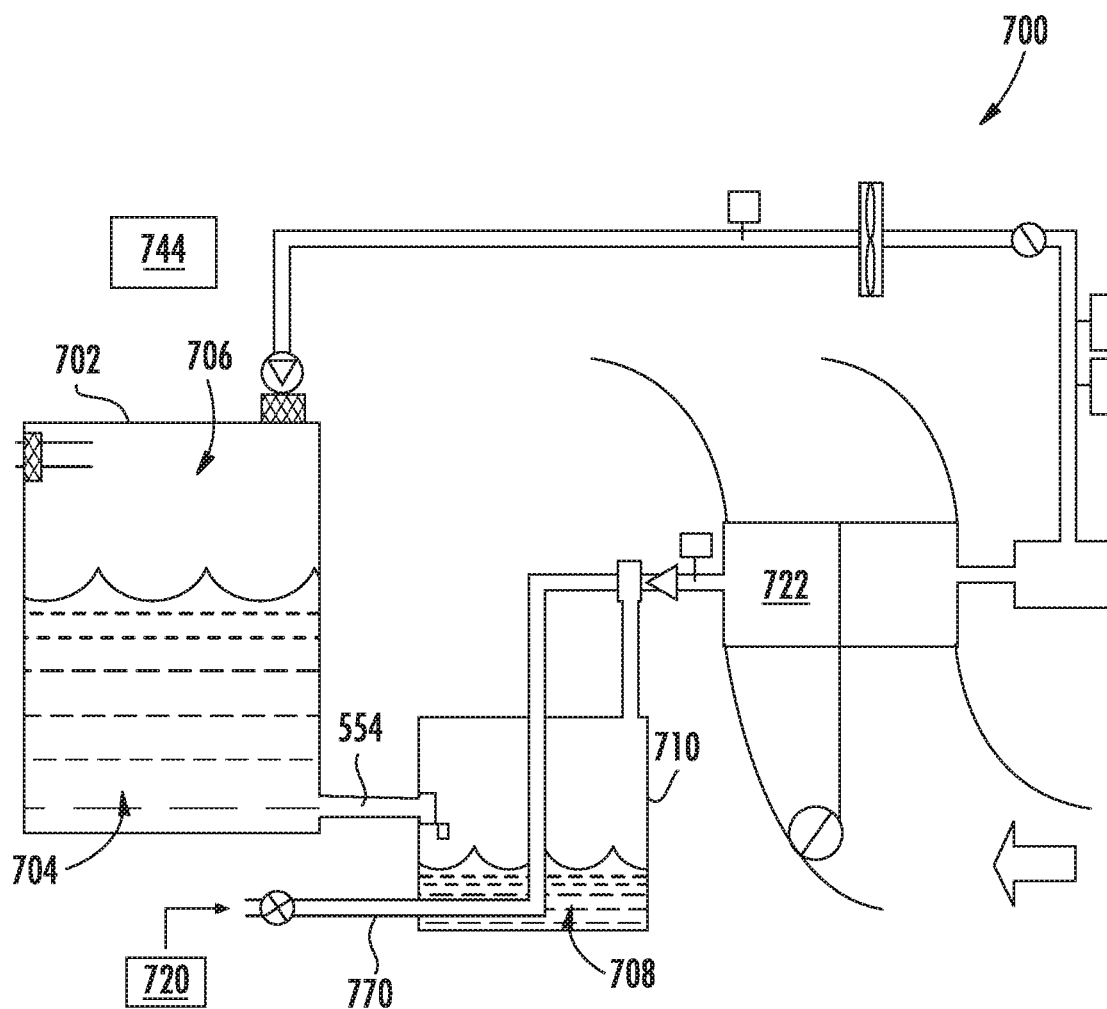
FIG. 7 is a schematic illustration of a fuel tank inerting system in accordance with an embodiment of the present disclosure.

Turning now to FIG. 7, an embodiment of an inerting system 700 in accordance with the present disclosure is shown. The inerting system 700 may be similar to that shown and described above, and thus similar features may not be shown or discussed for simplicity. The inerting system 700 enables the elimination of the heater that is used to vaporize the inerting fuel that is within an evaporator container.

As shown, the inerting system 700 includes a fuel tank 702 having fuel 704 therein, with an ullage space 706 formed as fuel 704 is consumed during use. An inerting supply line 754 fluidly connects the fuel tank 702 to an evaporator container 710, as described above. The amount of fuel 704 that is extracted into the evaporator container 710 (i.e., the amount of inerting fuel 708) can be controlled by an evaporator container valve, such as a float valve, and/or operation and/or control by a controller 744. The inerting fuel 708 is vaporized within the evaporator container 710 to generate a first reactant for use within a catalytic reactor 722. A second reactant can be sourced from a second reactant source 720, as described above. The first and second reactants are reacted within the catalytic reactor 722 to generate an inert gas for supply into one or more fuel tanks (e.g., fuel tank 702).

In this embodiment, to provide thermal energy for evaporation of the inerting fuel 708, rather than employing a heater element or device, the thermal energy can be supplied from the second reactant source 720. That is, relatively warm air (such as bleed air from a turbine engine) can be directed into and/or through the evaporator container 710 through a heating duct 770. The heating duct 770 can pass through an interior of the evaporator container 710, may be wrapped around the evaporator container 710, and/or may have another arrangement such that thermal energy within heating duct 770 can be transferred into the inerting fuel 708 to thus vaporize the inerting fuel 708.

Although heating is provided into the inerting fuel to generate the first reactant (e.g., vaporization of fuel), the catalyst of the system is exothermic and thus generates heat. Accordingly, it may be desirable to control temperatures such that the system does not over heat and/or such that an efficient temperature for catalyzation of the first and second reactants can be maintained within the catalyst. To achieve such temperature control, various systems are provided herein.

Figure 8:
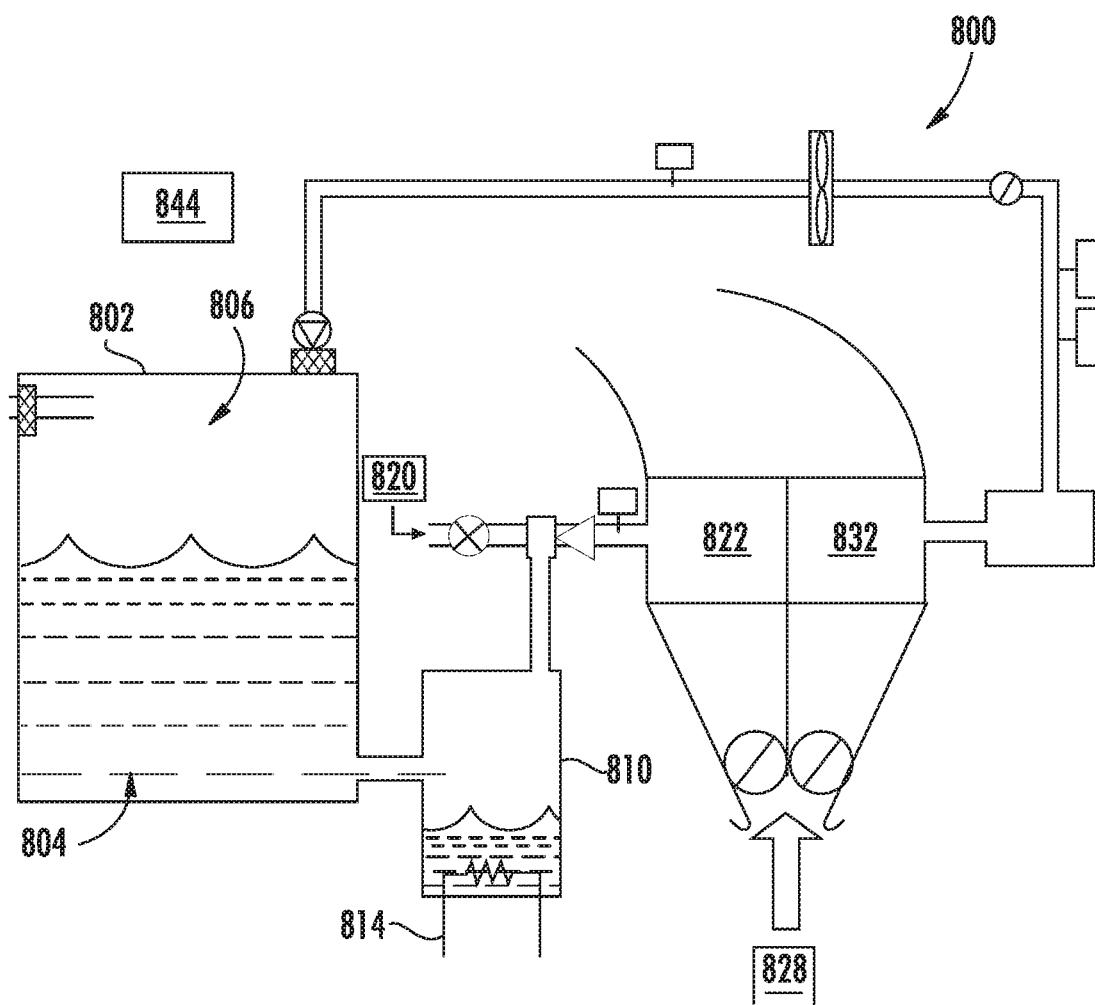
FIG. 8 is a schematic illustration of a fuel tank inerting system in accordance with an embodiment of the present disclosure.

Turning now to FIG. 8, an embodiment of an inerting system 800 in accordance with the present disclosure is shown. The inerting system 800 may be similar to that shown and described above, and thus similar features may not be shown or discussed for simplicity. The inerting system 800 employs various sources of air for cooling one or both of a catalytic reactor 822 and/or a heat exchanger 832. That is, a cool air source 828 can replace the typical ram air source.

As shown, the inerting system 800 includes a fuel tank 802 having fuel 804 therein, with an ullage space 806 formed as fuel 804 is consumed during use. An inerting supply line fluidly connects the fuel tank 802 to an evaporator container 810, as described above. The amount of fuel 804 that is extracted into the evaporator container 810 (i.e., the amount of inerting fuel 808) can be controlled by an evaporator container valve and/or operation and/or control by a controller 844. In this illustrative embodiment, the inerting fuel 808 is vaporized using a heater 814 to generate a first reactant. A second reactant is sourced from a second reactant source 820, and the first and second reactants are mixed. The mixed first and second reactants are reacted within the catalytic reactor 822 to generate an inert gas for supply into one or more fuel tanks (e.g., fuel tank 802). The reactions that take place within the catalytic reactor 822 generates heat, with hot catalyzed product flowing into the heat exchanger 832. As noted above, cooling for the catalytic reactor 822 and/or the heat exchanger 832 (e.g., for cool air supply and thermal transfer) is typically ram air.

In the present embodiment, the cool air source 828 is not ram air, but rather is sourced from another location on the aircraft. For example, in some embodiments, the cool air source 828 may be discharge from an environmental control system of the aircraft. Using outlet air from an environmental control system may enable condensing more water out of the inert gas stream and prevent such moisture from flowing into to the fuel tank 802. In another embodiment, the cool air source 828 may be discharge from a cabin of the aircraft. In such embodiments, the use of cabin air can reduce ram air bleed, and thus reduce aircraft drag. In either arrangement, the cool air source 828 is provided to enable cooling of the catalytic reactor 822 as well as enable a condensing function within a heat exchanger 832, as described above. The heat exchanger 832 operates as a condenser on a catalyzed mixture to separate out an inert gas and a byproduct, as described above.

Figure 9:
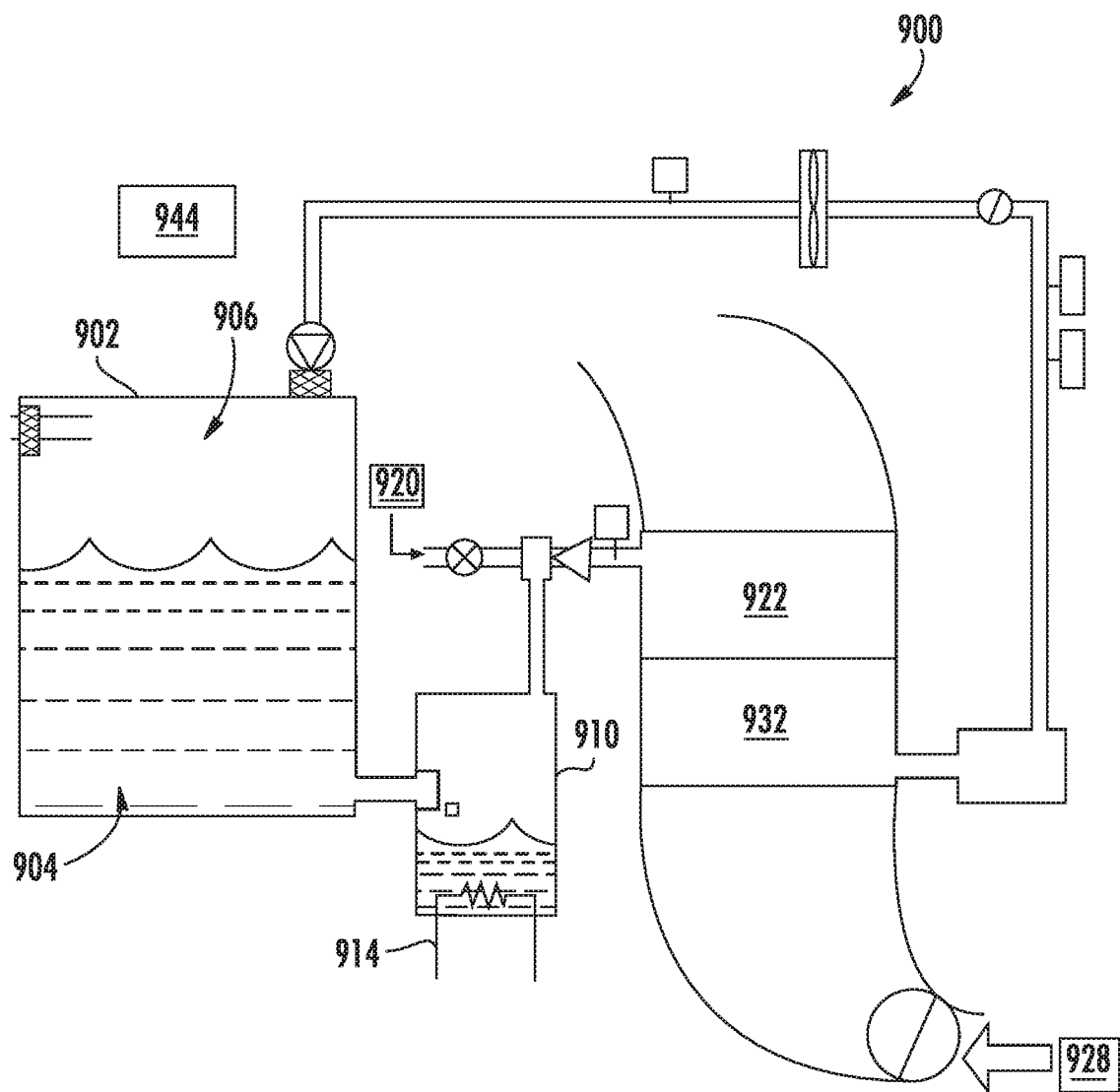
FIG. 9 is a schematic illustration of a fuel tank inerting system in accordance with an embodiment of the present disclosure.

Another way of controlling temperatures within the fuel inerting systems is to rearrange the catalyst and heat exchanger arrangement. For example, turning now to turning now to FIG. 9, an embodiment of an inerting system 900 in accordance with the present disclosure is shown. The inerting system 900 may be similar to that shown and described above, and thus similar features may not be shown or discussed for simplicity. The inerting system 900 employs a modified arrangement of a catalytic reactor 922 and a heat exchanger 932. In this embodiment, a cool air source 928 can be a typical ram air source arrangement.

As shown, the inerting system 900 includes a fuel tank 902 having fuel 904 therein, with an ullage space 906 formed as fuel 904 is consumed during use. An inerting supply line fluidly connects the fuel tank 902 to an evaporator container 910, as described above. The amount of fuel 904 that is extracted into the evaporator container 910 (i.e., the amount of inerting fuel 908) can be controlled by an evaporator container valve and/or operation and/or control by a controller 944. In this illustrative embodiment, the inerting fuel 908 is vaporized using a heater 914 to generate a first reactant. A second reactant is sourced from a second reactant source 920, and the first and second reactants are mixed. The mixed first and second reactants are reacted within the catalytic reactor 922 to generate an inert gas for supply into one or more fuel tanks (e.g., fuel tank 902). Water vapor may be condensed out of the catalyzed gas by passing through a heat exchanger 932, similar to that described above.

However, in the present embodiment, rather than the catalyst being adjacent to the heat exchanger such that both components may be supplied with cooling air next to each, the catalytic reactor 922 is arranged downstream from the heat exchanger 932. As such, a cooling flow from the cool air source 928 may provide a coolest air to the heat exchanger 932 and a slightly warmer air may extend the heat exchanger 932 to enter the catalytic reactor 922 and enable temperature control within the catalytic reactor 922. Typically, using a catalyst cooled by ram air to inert a fuel tank, during cruise operation, the ram air flow needs to be reduced so significantly that the temperature of the air coming out of the cold side outlet of the catalyst can be excessive. In the arrangement shown in FIG. 9, the airflow through the ram circuit can be increased such that the exhaust of the cold side of the catalytic reactor 922 (after passing through the heat exchanger 932) can be maintained below 450° F.

Figure 10:
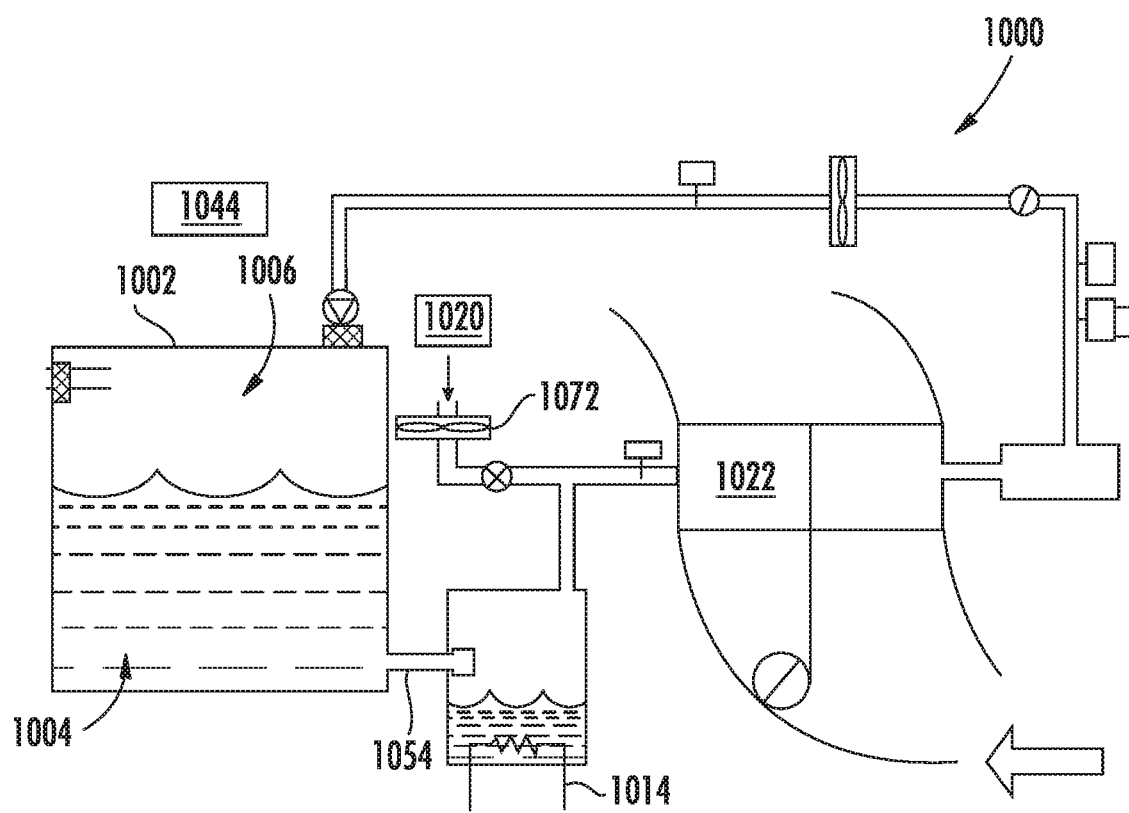
FIG. 10 is a schematic illustration of a fuel tank inerting system in accordance with an embodiment of the present disclosure.

Turning now to FIG. 10, an embodiment of an inerting system 1000 in accordance with the present disclosure is shown. The inerting system 1000 may be similar to that shown and described above, and thus similar features may not be shown or discussed for simplicity. In this embodiment, the inerting system 1000 employs ambient air as a second reactant source 1020 as compared to the typical bleed air source used in several of the above described arrangements. Bleed air can supply pressurized air and oxygen into the inerting system 1000. However, it may be advantageous to reduce or eliminate the amount of bleed air in aircraft systems, as such reductions can increase fuel efficiencies and/or reduce the need to install ducting within the aircraft to supply bleed air to the fuel inerting system.

As shown, the inerting system 1000 includes a fuel tank 1002 having fuel 1004 therein, with an ullage space 1006 formed as fuel 1004 is consumed during use. An inerting supply line fluidly connects the fuel tank 1002 to an evaporator container 1010, as described above. The amount of fuel 1004 that is extracted into the evaporator container 1010 (i.e., the amount of inerting fuel 1008) can be controlled by an evaporator container valve and/or operation and/or control by a controller 1044. In this illustrative embodiment, the inerting fuel 1008 is vaporized using a heater 1014 to generate a first reactant. A second reactant is sourced from a second reactant source 1020, which in this embodiment is ambient air. The first and second reactants are mixed and then reacted within a catalytic reactor 1022 to generate an inert gas for supply into one or more fuel tanks (e.g., fuel tank 1002). In the present embodiment, the second reactant source 1020 is not bleed air, but rather is sourced from the ambient air outside of the aircraft. In this arrangement, a blower or fan 1072 is arranged in or along a flow line of the second reactant source 1020 and ambient air can be drawn through the system, thus eliminating the use of bleed air.

Figure 11:
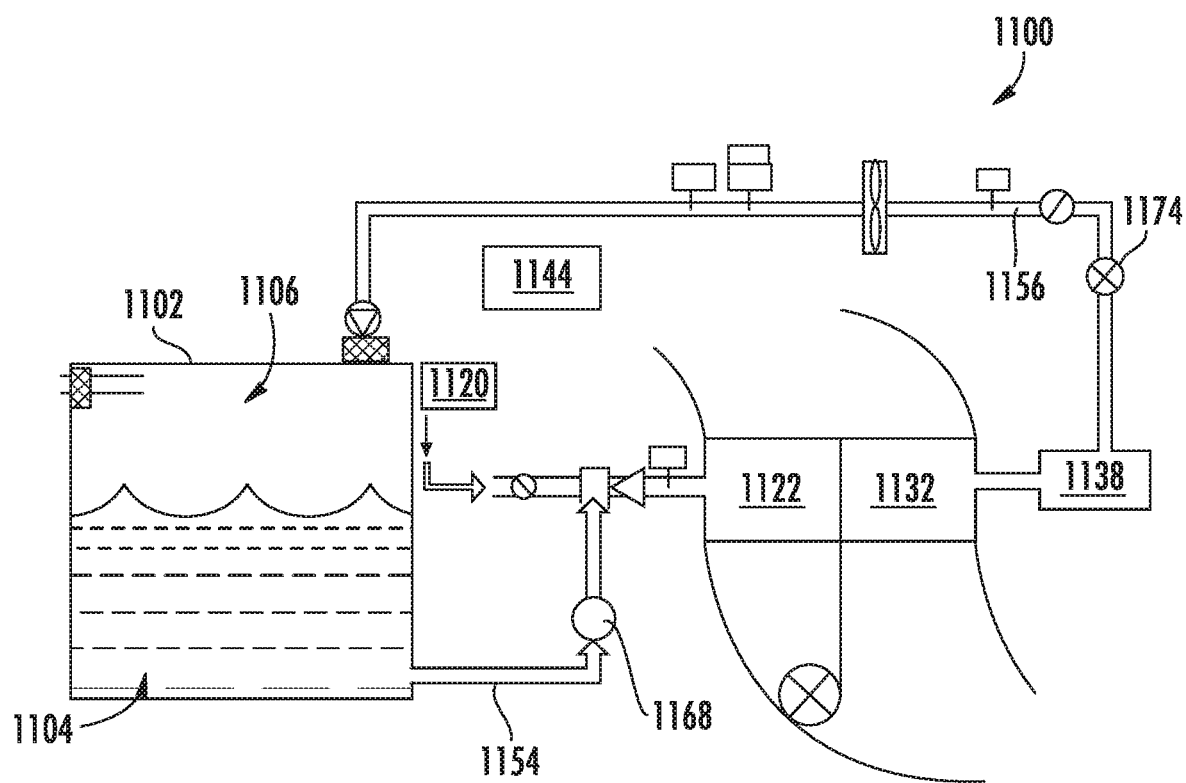
FIG. 11 is a schematic illustration of a fuel tank inerting system in accordance with an embodiment of the present disclosure.

Turning now to FIG. 11, an arrangement of an inerting system 1100 in accordance with an embodiment of the present disclosure is shown. The inerting system 1100 may be similar to that shown and described above, and thus similar features may not be shown or discussed for simplicity. In this embodiment, the inerting system 1100 employs a back pressure flow restrictor 1174 positioned within or along a fuel tank supply line 1156 downstream of a catalytic reactor 1122.

As shown, the inerting system 1100 includes a fuel tank 1102 having fuel 1104 therein, with an ullage space 1106 formed as fuel 1104 is consumed during use. An inerting supply line 1154 fluidly connects the fuel tank 1102 to supply inerting fuel and/or a first reactant to the catalytic reactor 1122. As shown, in this embodiment, a fuel-pump assembly 1168 (e.g., similar to that shown and described in FIGS. 6A-6B) is installed within or along the inerting supply line 1154. A second reactant from a second reactant source 1120, with a mixture of the first and second reactants supplied to the catalytic reactor 1122 for catalyzing. The operation of the fuel-pump assembly 1168 can be controlled by a controller 1144.

For condensation and removal of water vapor, the minimum condenser temperature within a heat exchanger 1132 would be slightly above freezing. For condensation at atmospheric pressure, this temperature would result in approximately 0.6% mole fraction of water vapor in the saturated gas stream exiting the heat exchanger 1132, because the $H_2O$ saturation vapor pressure at a temperature just above freezing is approximately 0.6 kPa (and atmospheric pressure is approximately 100 kPa). Because the $H_2O$ saturation vapor pressure is only a function of temperature (and not of total pressure), at higher total pressure the mole fraction of water vapor becomes smaller, i.e., the gas stream exiting the heat exchanger 1132 becomes drier. For example, at 10 atm pressure (approximately 1000 kPa) the mole fraction of water vapor in the saturated gas stream exiting the heat exchanger 1132 would be approximately 0.06%. Thus, higher pressure operation is advantageous in keeping the fuel system dry, because a drier gas stream would be supplied to the ullage space 1106 in the fuel tank 1102. In addition, operation of the catalytic reactor 1122 and heat exchanger 1132 at higher pressure would reduce the size required for these components because the working fluid (gas) would become more dense, and because heat transfer rates per unit surface area would increase with pressure (increase with working fluid density and Reynolds number).

The embodiment of FIG. 11 enables operation of the inerting system 1100 at higher pressures than a pressure within the fuel tank 1102. The increased pressure can enable reducing the required size of the catalytic reactor 1122 and/or heat exchanger 1132 and also provide a drier inert gas stream that is returned to the fuel tank 1102. To operate at higher pressures, liquid fuel from the fuel tank 1102 is pumped to higher pressure for delivery to the catalytic reactor 1122 by the fuel-pump assembly 1168, and a high-pressure second reactant source 1120, such as from an aircraft engine, is provided for catalytic oxidation of the fuel. The back pressure flow restrictor 1174 is provided to regulate the operating pressure of the inerting system 1100, particularly at the catalytic reactor 1122 and the heat exchanger 1132. The back pressure flow restrictor 1174 can be configured to be actively controlled by the controller 1144 or may be a passive valve. In some embodiments, the back pressure flow restrictor 1174 may be a throttling valve, an electronic control valve (e.g., pneumatic control with feedback), a passive orifice or restriction in the flow line, a mechanical valve, or other type of flow restrictor, as will be appreciated by those of skill in the art. In some embodiments, controlled back pressure flow restrictors can be controlled in response to operating conditions of the aircraft.

The back pressure flow restrictor 1174 is arranged to maintain high-pressure operation of the catalytic reactor 1122 and the heat exchanger 1132. The increased pressure provided by the back pressure flow restrictor 1174 enables more efficient water removal from the inerting system 1100. As shown, the back pressure flow restrictor 1174 is located downstream of the catalytic reactor 1122 and the heat exchanger 1132, and in this embodiment, downstream of a water separator 1138, although in some embodiments, the water separator 1138 can be omitted. Further, in some embodiments that include a water separator, the back pressure valve can be positioned downstream from the catalytic reactor 1122 and the heat exchanger 1132 but upstream of the water separator 1138.

Figure 12:
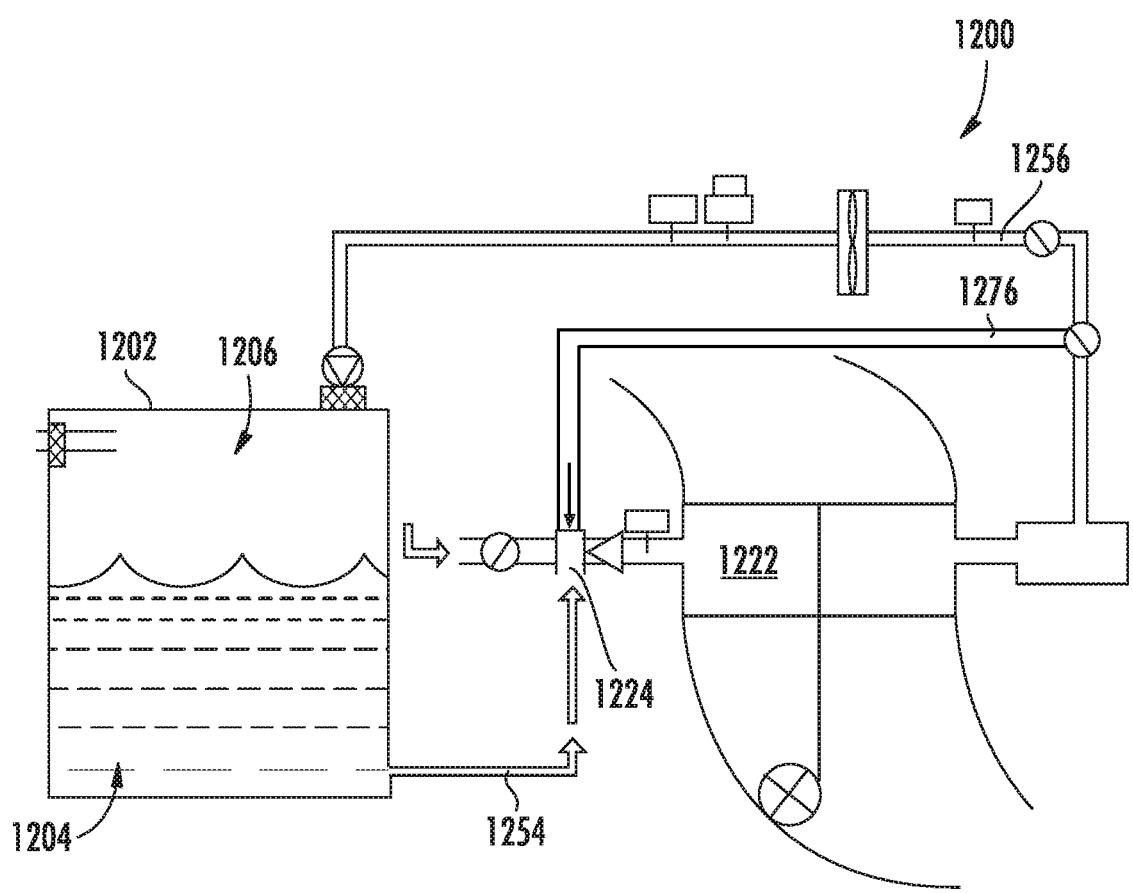
FIG. 12 is a schematic illustration of a fuel tank inerting system in accordance with an embodiment of the present disclosure.

Turning now to FIG. 12, an arrangement of an inerting system 1200 in accordance with an embodiment of the present disclosure is shown. The inerting system 1200 may be similar to that shown and described above, and thus similar features may not be shown or discussed for simplicity. In this embodiment, the inerting system 1200 employs an inert gas recycling system 1276 positioned within or along a fuel tank supply line 1256 downstream of a catalytic reactor 1222. As schematically shown in FIG. 12, the catalytic reactor 1222 has a different form factor than the other embodiments shown and described herein. For example, as shown, the catalytic reactor is a simple monolith structure.

As shown, the inerting system 1200 includes a fuel tank 1202 having fuel 1204 therein, with an ullage space 1206 formed as fuel 1204 is consumed during use. An inerting supply line 1254 fluidly connects the fuel tank 1202 to supply inerting fuel and/or a first reactant to the catalytic reactor 1222. As described above, the reaction between the first and second reactants (e.g., air and fuel) in the catalytic reactor 1222 returns an inert gas to the fuel tank 1202 (with or without water condensation and removal). Ideally, the gas stream returned to the fuel tank 1202 would have zero or minimal $O_2$ (for maximum inerting effect), which would require near-stoichiometric reaction between the first reactant (e.g., fuel) and the second reactant (e.g., air).

Unfortunately, reaction of fuel at near-stoichiometric conditions can result in significant heat release and overheating of the catalytic reactor 1222. In some embodiments, to prevent such overheating, a portion of the product stream exiting the catalytic reactor 1222 can be cooled and mixed with the first and second reactants before reaction at the catalytic reactor 1222. That is, the recycling system 1276 can supply a recycled product stream to the mixing of the first and second reactants, upstream of the catalytic reactor 1222. In some embodiments, the recycled product can have the same composition as the gas exiting the catalytic reactor 1222. In other embodiments, the recycled product supplied through the recycling system 1276 can have a different composition if the water is first condensed and removed (separated) from the exiting gas. Further, in some embodiments, if the water is condensed and separated, either the water itself can be recycled to the catalytic reactor 1222, or the gas stream without water (e.g., containing $CO_2$ and $N_2$) can be recycled to the catalytic reactor 1222.

Although shown in FIG. 12 with the recycling system 1276 located downstream or after a water separator 1238, in some embodiments, the water separator can be located downstream of the recycling system. That is, in some embodiments, a water separator can be placed in the line leading to the fuel tank, but after the extraction of the recycle stream. Those of skill in the art will appreciate that the location of an extraction point for the recycling system can be located anyway along a fluid line of the systems described herein. Such arrangement can allow water to be recycled to the catalyst (to help with catalyst cooling), and allow removal of water before delivery of dry inert-gas (or dry low-oxygen gas) to the fuel tank ullage. Further, in some embodiments, regardless of where the water is removed from the line, some portion of the extracted water can be added to the recycle stream (or directly delivered to the catalyst) to help keep the catalyst cool.

Regardless of the source or composition of the recycled product, operation of the catalytic reactor 1222 at a safe temperature while fuel and air are catalytically reacted at near-stoichiometric conditions is achievable. For example, by cooling and recycling a portion of the product stream to act as a diluent during reaction, the temperature rise associated with reaction of fuel with air can be reduced. In addition, if desired, the recycled product stream (e.g., cool diluent) can be used as a sparge gas to deliver fuel vapor to the catalyst.

Figure 13:
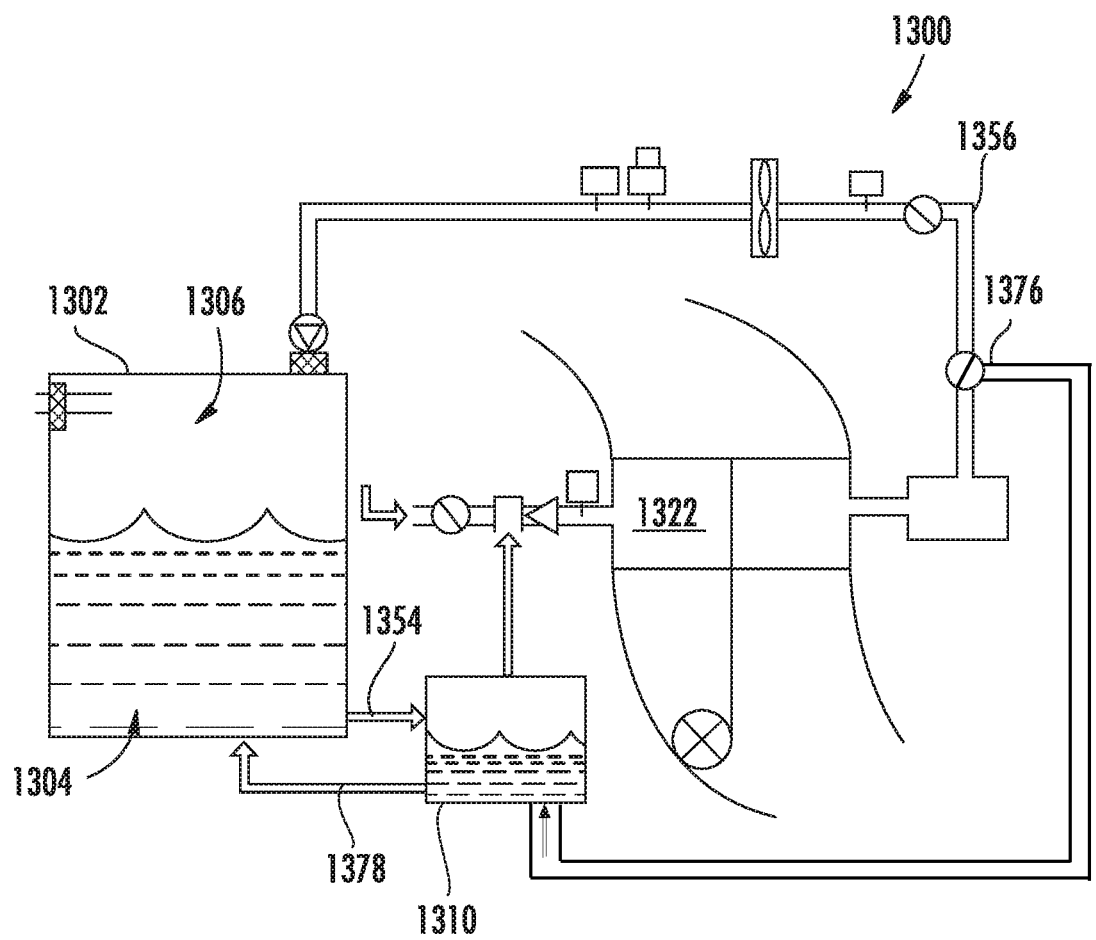
FIG. 13 is a schematic illustration of a fuel tank inerting system in accordance with an embodiment of the present disclosure.

For example, turning now to FIG. 13, an arrangement of an inerting system 1300 in accordance with an embodiment of the present disclosure is shown. The inerting system 1300 may be similar to that shown and described above, and thus similar features may not be shown or discussed for simplicity. In this embodiment, the inerting system 1300 employs an inert gas recycling system 1376 positioned within or along a fuel tank supply line 1356 downstream of a catalytic reactor 1322, but may supply the recycled product stream to an evaporator container 1310.

As shown, the inerting system 1300 includes a fuel tank 1302 having fuel 1304 therein, with an ullage space 1306 formed as fuel 1304 is consumed during use. An inerting supply line 1354 fluidly connects the fuel tank 1302 to the evaporator container 1310 to generate an inerting fuel and/or a first reactant to be supplied to a catalytic reactor 1322. As described above, the reaction between the first and second reactants (e.g., air and fuel) in the catalytic reactor 1322 returns an inert gas to the fuel tank 1302 (with or without water condensation and removal).

Similar to the embodiment shown in FIG. 12, the inerting system 1300 includes a recycling system 1376. In this case, the recycling system 1376 diverts a portion of the product stream exiting the catalytic reactor 1322 from the fuel tank supply line 1356. The extracted product is supplied into the evaporator container 1310. As shown, a return line 1378 can be arranged to cycle a portion of the fuel within the evaporator container 1310 back to the fuel tank 1302. In this embodiment, the recycled gas would flow through the recycling system 1376 and into the evaporator container 1310 to perform sparging. As such, the recycled gas would accrue fuel vapor to formed sparge-gas and a sparge-gas/fuel-vapor mixture would then be mixed with air and delivered to the catalytic reactor 1322.

Although shown herein with the recycle stream being purely directed to and passing through the sparger (i.e., evaporator container 1310), the present disclosure is not so limited. For example, in some non-limiting embodiments, a portion of the recycle stream is directed to pass through the sparger and the remainder of the recycle stream is sent directly to the catalyst (i.e., bypassing the sparger and feeding directly into the catalyst 1322). That is, in some embodiments, two recycle lines can be employed that combine the arrangements shown in FIGS. 12-13. In such embodiments, by allowing only a fraction of the recycle stream to pass through the sparger, the sparger flowrate can be adjusted as needed, independently of the recycle flow rate.

In either of the embodiments shown in FIGS. 12-13, a recycled product (e.g., an inert gas) is recycled to the inlet of the catalytic reactor. The inert gas can act as a heat absorber and have no reaction within the catalytic reactor. Because the recycled product will not react with the catalytic reactor (i.e., no chemical reaction) no heat will be generated by this portion of the gas flowing into and through the catalytic reactor. Accordingly, the fuel-air mixture of the first and second reactants will be diluted, which will thus lower the temperature within the catalytic reactor.

In some embodiments, the recycling systems 1276, 1376 can include pumps or blowers arranged to force a portion of the product stream back upstream of the respective catalytic reactor 1222, 1322. Further, one or more valves may be part of the recycling systems 1276, 1376 to control a volume of the bled off product from the fuel tank supply line 1256, 1356. In some embodiments, an ejector pump or an injector pump can be located upstream of the catalytic reactor with a flow line connected downstream from the catalytic reactor, with the ejector pump or injector pump drawing the product back to an upstream position. In some embodiments, a blower can be arranged downstream of the catalytic reactor with the blower arranged to draw off and blow a portion of the product stream back to upstream of the catalytic reactor. In some embodiments, a controller can be arranged to control an amount of product stream that is recycled as compared to an amount that is supplied into the ullage, as described above.

The recycling systems provided herein can be arranged to recycle any given or predetermined ratio or percentage. For example, in a non-limiting example, fifty-parts of the reacted product stream may be recycled for every one-part that is supplied into the ullage. This is merely an example, and in some embodiments, as much as 99% of the reacted product stream can be recycled, with only 1% being supplied into the ullage. In contrast, at the other extreme, a very low percentage, such as 5% or lower of the reacted product stream can be recycled, with 95% or more of the reacted product stream being supplied into the ullage.

Turning now to FIG. 14, an arrangement of an inerting system 1400 in accordance with an embodiment of the present disclosure is shown. The inerting system 1400 may be similar to that shown and described above, and thus similar features may not be shown or discussed for simplicity. In this embodiment, the inerting system 1400 employs a fuel vaporization system 1480. The fuel vaporization system 1480 is arranged to transfer fuel 1404 from an aircraft fuel tank 1402 into a container 1482, which is arranged to perform sparging. The fuel 1404 is metered into the container 1482 by a container valve 1412. Air is introduced from an air source 1484 to a location below the fuel level within the container 1482. The introduction of the air into the fuel may be through a nozzle or frit 1486 located within the container 1482. The air will pass through the fuel as air bubbles and fuel vapor will evaporate into the air bubbles. The combined fuel-and-air bubbles will be deposited in a vapor space 1488 above the fuel level in the container 1482, thus forming a vaporized fuel-air mixture in the vapor space 1488. In some embodiments, the fuel-air mixture can be set by the temperature of the air entering the container 1482 from the air source 1484 and/or controlled by the design of the nozzle or frit 1486. The fuel-air mixture within the vapor space 1488 can be then used to feed a catalytic reactor 1422. Further, as shown schematically, in some embodiments, a portion of the air from the air source 1484 can be directed to mix downstream of the vapor space 1488, prior to introduction (e.g., injection) into the catalytic reactor 1422. Downstream of the catalytic reactor 1422, the inerting system 1400 may be substantially similar to one or more of the embodiments described above.

Advantageously, embodiments of the present disclosure provide efficient mechanisms for generating inert gas and supplying such inert gas into fuel tanks of aircraft. Further, advantageously, embodiments provided herein can prevent ambient air (possibly containing water) from entering an aircraft fuel tank. To prevent ambient air from entering the aircraft fuel tank, a controller of an inerting system as described herein, can supply inert gas into the fuel tank to maintain a desired pressure (e.g., providing a higher pressure within the fuel tank than ambient pressures). Such increased pressure can be employed within the fuel tank to prevent ingress of oxygen-rich air (e.g., ambient air). This may be particularly useful during a descent phase of flight of an aircraft as the ambient pressures increase as the altitude decreases.

The use of the terms "a," "an," "the," and similar references in the context of description (especially in the context of the following claims) are to be construed to cover both the singular and the plural, unless otherwise indicated herein or specifically contradicted by context. The modifier "about" and/or "approximately" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the invention has been described in detail in connection with only a limited number of embodiments, it should be readily understood that the invention is not limited to such disclosed embodiments. Rather, the invention can be modified to incorporate any number of variations, alterations, substitutions, combinations, sub-combinations, or equivalent arrangements not heretofore described, but which are commensurate with the spirit and scope of the invention. Additionally, while various embodiments of the invention have been described, it is to be understood that aspects of the invention may include only some of the described embodiments.

Accordingly, the present disclosure is not to be seen as limited by the foregoing description, but is only limited by the scope of the appended claims.

What is claimed is:

1. A fuel tank inerting system for an aircraft, the system comprising:
   a fuel tank;
   a first reactant source fluidly connected to the fuel tank, the first source configured to receive fuel from the fuel tank and generate a first reactant from the received fuel;
   a second reactant source configured to generate a second reactant;
   a catalytic reactor configured to receive a mixture of the first reactant and the second reactant, wherein the catalytic reactor is configured to generate an inert gas from the mixture of the first reactant and the second reactant and configured to supply said inert gas to the fuel tank to fill a ullage space of the fuel tank;
   an inert gas recycling system located downstream of the catalytic reactor and upstream of the fuel tank, wherein the inert gas recycling system is configured to recycle a portion of the inert gas back to the catalytic reactor; and
   a water separator located between the catalytic reactor and the fuel tank and downstream of the catalytic reactor, the water separator configured to extract water from the inert gas and direct at least a portion of the extracted water back to the catalytic reactor to provide cooling to the catalytic reactor.

2. The system of claim 1, wherein the first source is an evaporator container.

3. The system of claim 1, wherein the second source is at least one of a bleed port of an engine of an aircraft, ambient air, or an aircraft cabin.

4. The system of claim 1, further comprising a heat exchanger arranged between the catalytic reactor and the fuel tank and configured to at least one of cool and condense an output from the catalytic reactor to separate out the inert gas and a byproduct.

5. The system of claim 4, further comprising an aircraft environmental control system, wherein the environmental control system is configured to supply a cooling fluid to the heat exchanger to enable cooling of the output from the catalytic reactor within the heat exchanger.

6. The system of claim 1, further comprising an injector pump configured to receive the first reactant and the second reactant and to supply the mixture of the first reactant and the second reactant to the catalytic reactor.

7. The system of claim 1, further comprising a heating duct thermally connected to the catalytic reactor and arranged in thermal communication with the first reactant source to provide heat to the first reactant source to generate the first reactant.

8. The system of claim 1, wherein the aircraft comprises a cabin and the catalytic reactor is cooled using air extracted from the cabin.

9. A fuel tank inerting system for an aircraft, the system comprising:
   a fuel tank;
   a first reactant source fluidly connected to the fuel tank, the first reactant source configured to receive fuel from the fuel tank;
   a second reactant source configured to generate a second reactant;
   a catalytic reactor arranged to receive a mixture of the first reactant and the second reactant to generate an inert gas from the mixture of the first reactant and the second reactant and configured to supply said inert gas to the fuel tank to fill a ullage space of the fuel tank;
   a fuel-pump assembly arranged upstream of the catalytic reactor, the fuel-pump assembly configured to inject fuel into the catalytic reactor; and
   a water separator located between the catalytic reactor and the fuel tank and downstream of the catalytic reactor, the water separator arranged to extract water from the inert gas and direct at least a portion of the extracted water back to the catalytic reactor to provide cooling to the catalytic reactor.

10. The system of claim 9, wherein the fuel-pump assembly is configured to mix the first reactant and the second reactant and supply the mixed first and second reactants into the catalytic reactor.

11. The system of claim 9, wherein the fuel-pump assembly comprises a fuel pump and a high pressure air supply nozzle, wherein the fuel pump injects fuel into the high pressure air supply nozzle.

12. The system of claim 9, wherein the fuel-pump assembly comprises a mixing chamber, wherein the first reactant and the second reactant are mixed within the mixing chamber prior to entering the catalytic reactor.

* * * * *